(12) United States Patent
Scott

(10) Patent No.: US 10,339,751 B2
(45) Date of Patent: Jul. 2, 2019

(54) AUTOMATIC BRIGHTNESS CONTROL ON A GAMING MACHINE

(71) Applicant: AGS LLC, Las Vegas, NV (US)

(72) Inventor: Ian Robert Scott, Duluth, GA (US)

(73) Assignee: AGS LLC, Las Vegas, NV (US)

( * ) Notice: Subject to any disclaimer, the term of this patent is extended or adjusted under 35 U.S.C. 154(b) by 0 days.

(21) Appl. No.: 15/601,466

(22) Filed: May 22, 2017

(65) Prior Publication Data

US 2018/0336758 A1 Nov. 22, 2018

(51) Int. Cl.
*G07F 17/32* (2006.01)
*A63F 9/24* (2006.01)
*H05B 37/02* (2006.01)

(52) U.S. Cl.
CPC .......... *G07F 17/3206* (2013.01); *A63F 9/24* (2013.01); *G07F 17/32* (2013.01); *G07F 17/3202* (2013.01); *G07F 17/3211* (2013.01); *G07F 17/3234* (2013.01); *G07F 17/3241* (2013.01); *G07F 17/3269* (2013.01); *H05B 37/0218* (2013.01)

(58) Field of Classification Search
CPC ... G07F 17/32; G07F 17/3211; G07F 17/3223
See application file for complete search history.

(56) References Cited

U.S. PATENT DOCUMENTS

| | | | |
|---|---|---|---|
| 9,798,385 B1* | 10/2017 | Das | A61B 3/14 |
| 2002/0115487 A1* | 8/2002 | Wells | G07F 17/32 463/42 |
| 2005/0044236 A1* | 2/2005 | Stafford | H04L 29/06027 709/227 |
| 2006/0030406 A1* | 2/2006 | Seeling | A63F 3/00028 463/31 |
| 2006/0116203 A1* | 6/2006 | Nakada | A63F 13/10 463/30 |
| 2007/0032288 A1* | 2/2007 | Nelson | G07F 17/32 463/16 |
| 2007/0287538 A1* | 12/2007 | Ishikawa | G07F 17/32 463/31 |
| 2008/0113821 A1 | 5/2008 | Beadell et al. | |
| 2009/0104954 A1* | 4/2009 | Weber | G07F 17/32 463/1 |
| 2009/0291757 A1* | 11/2009 | Hilbert | G07F 17/3202 463/31 |

OTHER PUBLICATIONS

Manual for Samsung Panel Displays 2017, 203 pages.
Ty Edwards, AGS Work Instructions, Video Wall Signage, May 12, 2017, 4 pages.
PCT/US018/030417, International Search Report and Written Opinion dated Aug. 1, 2018, 26 pages.

* cited by examiner

*Primary Examiner* — Kevin Y Kim
(74) *Attorney, Agent, or Firm* — Vierra Magen Marcus LLP

(57) ABSTRACT

A display control system for a gaming machine is described. The display control system allows a gaming machine controller to directly control attributes of one or more video displays coupled to a gaming machine. Display attributes can be adjusted to account for different machine states which can occur when the gaming machine is operating in an attract mode, game play mode and tilt mode. A few examples of display attributes which can be controlled include but are not limited to power on or off, input source selection, contrast control, brightness control and color temp control.

23 Claims, 9 Drawing Sheets

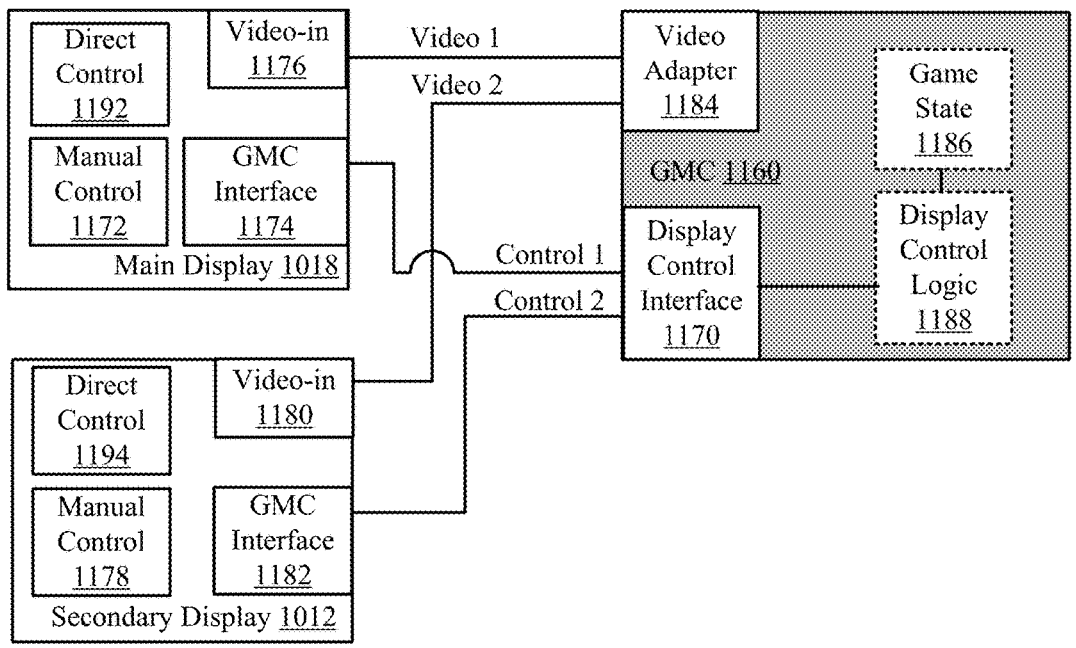

FIG. 4

| General Function | API Command | Specific Function |
|---|---|---|
| Power On/OFF | Did:all-pn 1602 | Turn on Display |
|  | Did:all-p 1604 | Standby Mode |
| Input Source Select | Did:all-s0 1606 | Select VGA RGB Input |
|  | Did:all-s1 1608 | Select DVI Input |
|  | Did:all-s2 1610 | Select HDMI Input |
| Contrast Control | Did:all-cu 1612 | Step UP Contrast value one count |
|  | Did:all-cd 1614 | Step UP Contract Value one count |
|  | Did:all-cnn 1616 | Set Contrast value to "nn", nn=00 to 99 |
| Brightness Control | Did:all-bu 1618 | Step UP Brightness value one count |
|  | Did:all-bd 1620 | Step Down Brightness value one count |
|  | Did:all-bnn 1622 | Set Brightness value to "nn", nn=00 to 99 |
| Color Temp Control | Did:all-tu 1624 | Set Color Temp to User values |
|  | Did:all-tc 1626 | Select Cool Color Temp value |
|  | Did:all-tw 1628 | Select Warm Color Temp value |
|  | Did:all-tn 1630 | Select Normal Color Temp value |
| Factory Reset | Did:all-fr 1632 | Restore Factory Setting for Display |
| Status Request | Did:all-ch 1634 | Request Status and Setting for Display |

FIG. 5

AUTOMATIC BRIGHTNESS CONTROL ON A GAMING MACHINE

TECHNICAL FIELD

The present disclosure relates to operating a gaming machine to generate a wager-based game.

Slot-type electronic gaming machines, often referred as slot machines, are popular fixtures in casino environments. Slot machines use mechanical reels or video reels to present an outcome of a slot game to a player. Player's derive entertainment value from the unique ways in which the slot game is played and presented on the gaming machine.

Bright and attractive graphics on a video display can draw a player's attention to a slot machine, which is a desirable feature. However, when playing a slot machine for a significant time period, a video display which is too bright can cause player eye strain. In view of the above, new ways of operating a gaming machine to control video display properties are desired.

OVERVIEW

Various embodiments of the present invention generally relate to operating a gaming machine to generate a wager-based video slot game. In particular embodiments, the video display used to output the wager-based slot game includes first firmware which allows display attributes to be manually adjusted and second firmware which allows display attributes to be remotely adjusted by the gaming machine controller. The second firmware supports a plurality of commands which can be utilized by the gaming machine controller to change display attributes, such as brightness, contrast, color temperature, power on/off and a selection of a video input source.

The gaming machine controller can include display control logic which monitors changes to the gaming machine operational state and based upon a current gaming machine operational state, determine display attributes for the current gaming machine operational state. In one embodiment, the gaming machine controller can set different display attributes depending on whether the gaming machine is in an attract state or a game state associated with game play. In particular, during an attract state, higher values of brightness and contrast can be used on the display. However, during game play, the brightness and/or contrast can be lowered to reduce player eye strain.

BRIEF DESCRIPTION OF THE DRAWINGS

The disclosure may best be understood by reference to the following description taken in conjunction with the accompanying drawings, which illustrate particular embodiments of the present invention.

FIG. 4 illustrates a block diagram of a display control system in accordance with embodiments of the present invention.

FIG. 5 illustrates a block diagram of a command structure for a display control system in accordance with embodiments of the present invention.

DETAILED DESCRIPTION

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

In general, gaming systems which provide wager-based games are described. In particular, with respect to FIGS. 1 and 2, gaming system including a wager-based gaming machines in communication with network devices are described. With respect to FIG. 3, a gaming machine controller used to control operations of gaming machine including generating play of a wager-based game is discussed.

With respect to FIG. 4, a display control system is described. The display control system can be used to control display attributes of one or more video displays coupled to a gaming machine. For example, the game controller can control the brightness of the displays. A command structure which can be utilized by a gaming machine controller to control various display attributes of one or more displays coupled to the gaming machine is discussed with respect to FIG. 5. A method of controlling video displays on a gaming machine is discussed with respect to FIG. 6.

Figure 7:
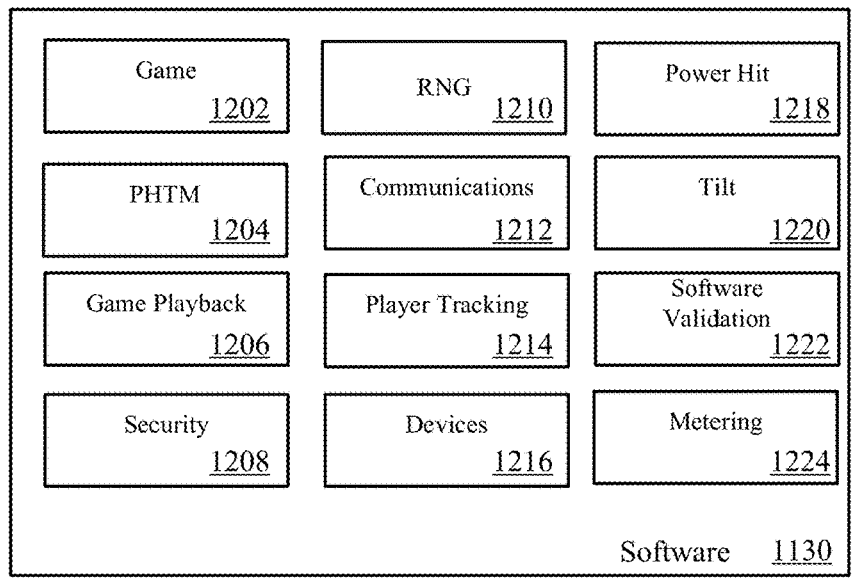
FIG. 7 illustrates a block diagram of gaming software in accordance with embodiments of the present invention.
Figure 8:
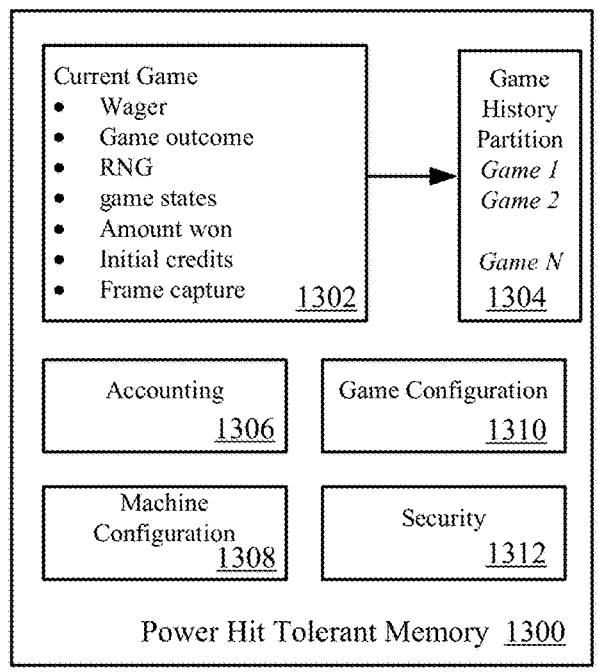
FIG. 8 illustrates a block diagram of power hit tolerant memory in accordance with embodiments of the present invention.

Gaming software used to generate the wager-based game is discussed with respect to FIG. 7. With respect to FIG. 8 illustrates a power hit tolerant memory configured to store crucial data generated from playing the wager-based game is discussed. In one embodiment, the crucial data can include information associated with the display attributes.

Figure 9:
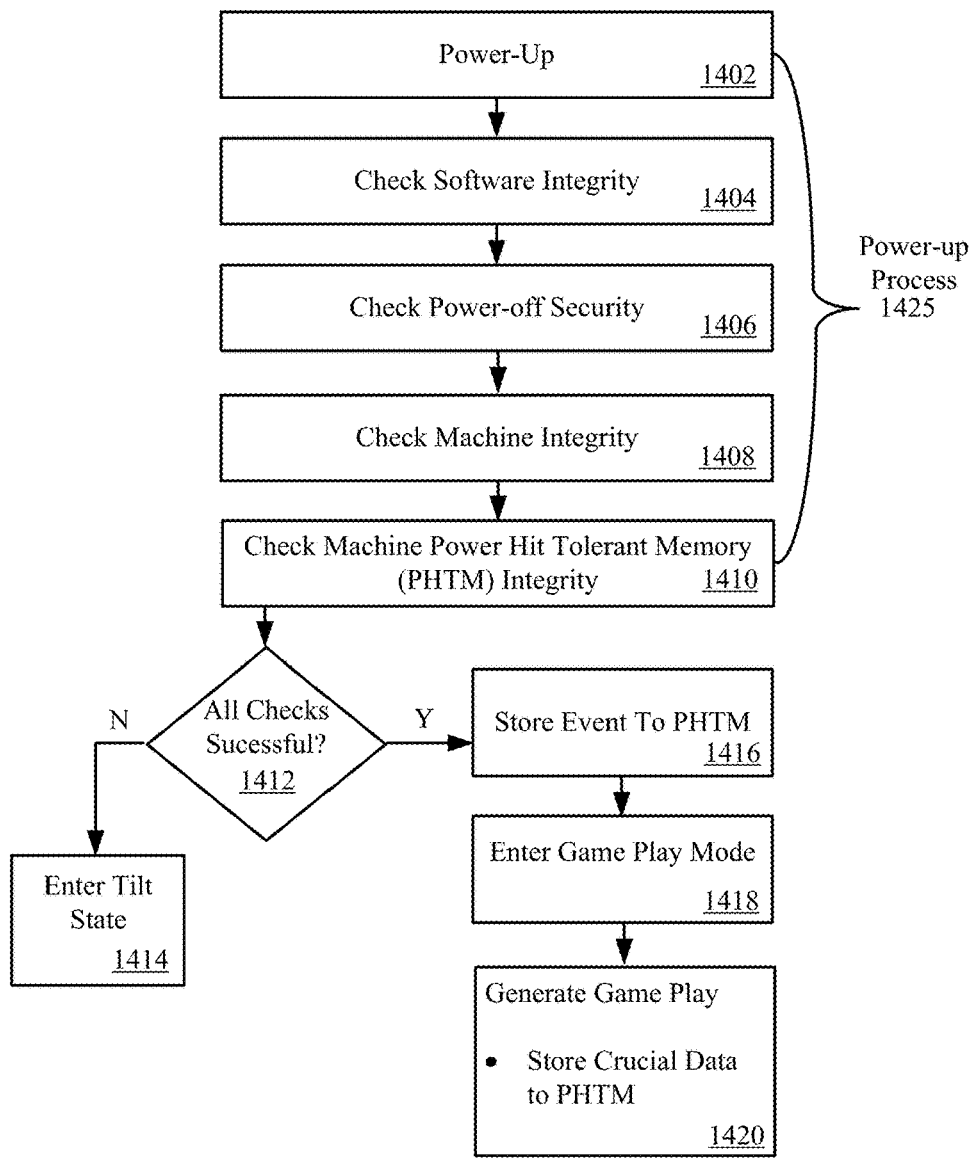
FIG. 9 illustrates a method for responding to a power interruption on a gaming machine in accordance with embodiments of the present invention.

With respect to FIG. 9, a method for responding to a power interruption on a gaming machine, which utilizes the power hit tolerant memory, is discussed. With respect to FIG. 10, a method of powering up a gaming machine is described. Finally, with respect to FIG. 11, a method playing back a a wager-based previously played on a gaming machine is discussed.

Figure 1:
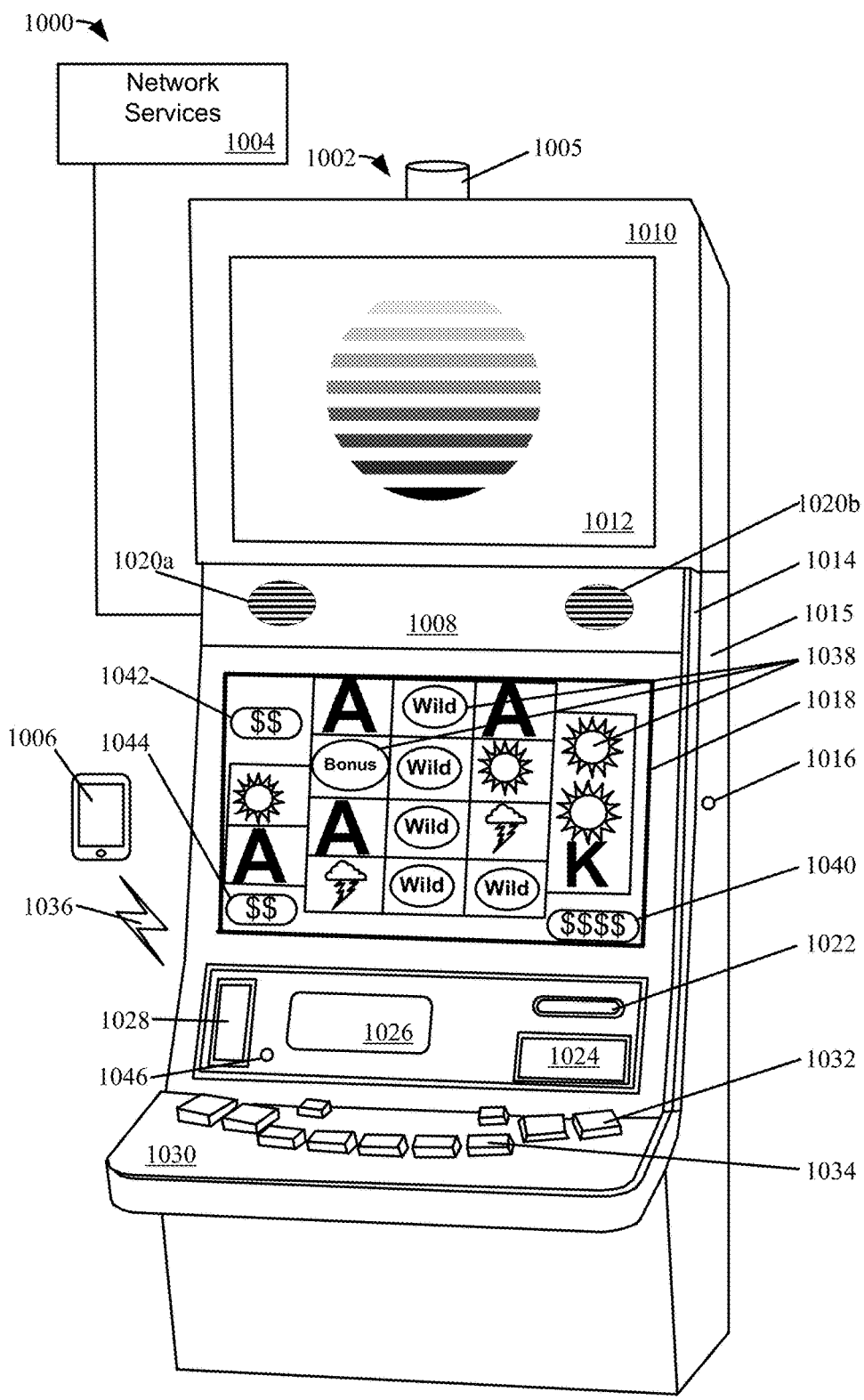
FIG. 1 illustrates a gaming system including a wager-based gaming machine in accordance with embodiments of the present invention.

FIG. 1 illustrates a gaming system 1000 including a wager-based gaming machine 1002. The wager-based gaming machine 1002 can include wireless or wired communication interfaces which allow communications with a remote devices providing network services 1004, such as but not limited to a player tracking system or a progressive gaming system (Network services are described in more detail with respect to FIG. 2). The player tracking system can be part of a slot accounting system. In addition, the gaming machine 1002 can include wireless communicate interfaces, such as wireless interface 1046, which allow communications with a nearby mobile device, such as a mobile phone 1006 or tablet computer, via a wireless connection 1036. The wireless interface 1046 can employ wireless communication protocols, such as Bluetooth™ or Wi-Fi.

The mobile phone or tablet computer can be utilized by a player or casino operator. A device carried by a player can be configured to perform gaming related functions, such as functions associated with transferring funds to or from the gaming machine or functions related to player tracking. A device carried by a casino operator can be configured to perform operator related functions, such as performing hand pays, responding to tilt conditions or collecting metering related information.

The gaming machine 1002 can include a cabinet 1008 and a top box 1010. The top box is mounted above the cabinet. The top box 1010 includes a display 1012. The display 1012 can be used to display video content, such as game art associated with the game played on the gaming machine 1002. For example, the game art can include an animated wheel. The animated wheel can be configured to spin and to stop to reveal a bonus award. In other examples, the video content can include advertising and promotions.

In alternate embodiments, the top box 1010 can include one or more mechanical devices in addition to the display or in lieu of the display. For example, a mechanical device, such as a mechanical wheel can be mounted to or within the top box 1010. The mechanical wheel can include markings that indicate various bonus awards. The wheel can be spun and stopped at a particular stopping point to reveal a bonus award. In yet other embodiments, the top box 1010 can include a plurality of displays.

The cabinet includes an entry instantiated as door 1014. The door 1014 swings outward and is coupled to a back portion 1015. The door 1014 includes a locking mechanism 1016. During operation, the door 1014 is locked. Typically, unlocking the door 1016 causes the gaming machine 1008 to enter a tilt mode where gaming functions, such as the play of a wager-based game, are not available. This tilt mode can be referred to as a hard tilt.

The cabinet 1008 can include a number of apertures that allow access to a portion of a number of devices which are mounted to the cabinet. These gaming devices can include, but are not limited to display 1018, speaker 1020a, speaker 1020b, a printer 1022, a bill acceptor 1024, a secondary display 1026, a card reader 1028 and a button panel 1030 including buttons 1032 and 1034. As described in more detail below, these gaming devices can be used to generate wager-based game play on the gaming machine 1002.

In particular embodiments, the bill acceptor 1024 can be used to accept currency or a printed ticket which can be used to deposit credits on the gaming machine 1002. The credits can be used for wagers. The printer 1022 can be used to print tickets to transfer credits from the gaming machine 1002. Typically, the tickets can be redeemed for cash or additional game play, such as game play on another gaming machine.

Figure 2:
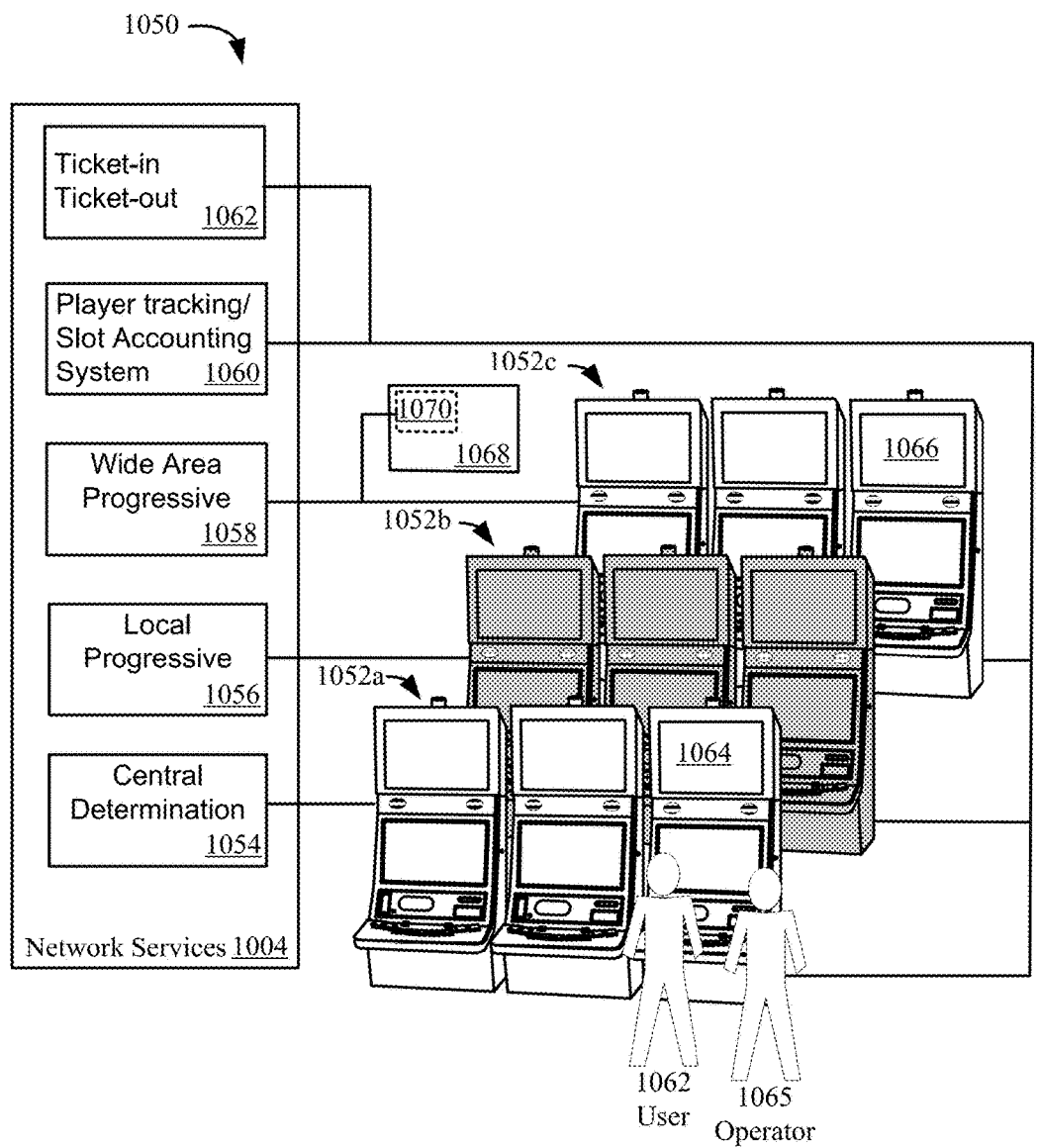
FIG. 2 illustrates a gaming system including three banks of gaming machines in accordance with embodiments of the present invention.

The bill acceptor 1024 and printer 1022 printer can be part of ticket-in/ticket-out (TITO) system 1062 in FIG. 2. The TITO system 1062 can be included in the network services 1004. The TITO system allows a ticket printed at a first gaming machine with a credit amount to be inserted into a bill acceptor at a second gaming machine and validated for game play. After validation, the credit amount associated with the ticket can be made available for game play on the second gaming machine. Additional details of the TITO system 1062 are described with respect to FIG. 2.

The bill acceptor 1024 can include a slot surround by a bezel which allows banknotes of various denominations or printed tickets to be inserted into the bill acceptor. The bill acceptor 1024 can include sensors for reading information from the banknotes and determining whether the banknotes inserted through the slot are valid. Banknotes determined to be invalid, such as damaged or counterfeit notes, can be ejected from the bill acceptor 1024. In some instances, the bill acceptor 1024 can include upgradeable firmware and a network connection. Via the network connection, new firmware, such as new counterfeit detection algorithms can be downloaded to the bill acceptor 1024.

The bill acceptor 1024 includes mechanisms for guiding the banknotes or printed tickets past the internal sensors. Banknotes or printed tickets which are accepted can be guided to a bill stacker (not shown) located within the cabinet 1008 of the gaming machine 1002. The bill stacker can hold a maximum number of bank notes or printed tickets, such as up to two thousand.

The gaming machine 1002 can include a sensor for detecting a fill level of the bill stacker. When the bill stacker is full or close to being full, the gaming machine 1002 can be placed in a tilt mode. Next, the cabinet door 1014 can be opened and the full bill stacker can be replaced with an empty one. Then, the door 1014 can be closed and the gaming machine 1002 can be restored to an operational mode in which it is available for game play.

One function of the printer 1022 is to print "cash out" tickets. In a "cash out," credits available on the gaming machine can be transferred to an instrument, such as a printed ticket, or electronically transferred to an account for later access. Typically, a "cash out" can be initiated in response to pressing one of the physical buttons, such as 1032 or 1034, or touch screen button output on a display, such as display 1018.

In one embodiment, the printer 1022 can be a thermal printer. The printer can be loaded with a stack of tickets, such as a stack with two hundred, three hundred or four hundred tickets. Mechanisms in the printer can grab tickets from the ticket stack and transport the tickets past the print heads for printing. The ticket stack can be located in an interior of the gaming machine cabinet 1008.

The printer 1022 can include sensors for detecting paper jams and a status of the ticket stack. When a paper jam or low ticket stack is detected, the gaming machine 1002 can enter a tilt mode where game play is suspended. In one embodiment, tower light 1005 can light to indicate the tilt status of the gaming machine 1002. After the tilt condition is cleared, such as by clearing the paper jam or replenishing the ticket stack, the gaming machine 1002 can enter an operational mode where game play is again available.

In particular embodiments, the printer 1022 can be coupled to a gaming machine controller (see 1160 in FIG. 2). The gaming machine controller 1160 can be configured to send commands to the printer which cause a "cash out," ticket to be generated. In addition, the printer 1022 can be coupled to other systems, such as a player tracking system (e.g., 1060 in FIG. 2). When coupled to the player tracking system, commands can be sent to the printer 1022 to output printed tickets redeemable for comps (comps refer to complimentary awards, such as but not limited to free credits, a free drink, a free meal or a free room) or printed coupons redeemable for discounts on goods and services.

In additional embodiments, a wireless interface 1046 can be provided to generate the wireless connection 1036. The wireless connection can be established between the gaming machine 1002 and a mobile device, such as 1006. The wireless connection 1036 can be used to provide functions, such as but not limited to player tracking services, casino services (e.g., ordering drinks) and enhanced gaming features (e.g., displaying game play information on the mobile device). The wireless interface can be provided as a stand-alone unit or can be integrated into one of the devices, such as the bill/ticket acceptor 1022 and the card reader 1028. In addition, the bill/ticket acceptor 1022 and the card reader 1028 can each have separate wireless interfaces for interacting with the mobile device. In one embodiment, these wireless interfaces can be used with a wireless payment system, such as Apple Pay™ or Google Pay™. The wireless payment system can be used to transfer funds to the gaming machine that can be used for wager-based game play.

The door 1014 can allow access an interior of the cabinet 1008. Via this access, devices mounted to the cabinet, such as display 1018, speaker 1020, bill/ticket acceptor 1022 or printer 1024 can be serviced and maintained. For example, a receptor configured to receive currency and tickets, coupled to the bill acceptor, can be emptied. The receptor is often referred to as a bill stacker. In another example, blank tickets can be added to the printer 1022 or paper jams can be cleared from the printer. When door 1014 is opened, the gaming machine can enter a hard tilt state where game play is disabled.

In addition, a number of devices (not shown) can be provided within the interior of the cabinet 1008. A portion of these devices is not visible through an aperture in the gaming machine cabinet 1008. For example, a gaming machine controller (GMC) which controls play of a wager-based game on the gaming machine can be found within the cabinet 1008. Typically, the gaming machine controller is secured within a separate lockable enclosure. Details of the gaming machine controller are described below with respect to element 1160 in FIG. 3.

As another example, a number of security sensors can be placed within the interior of the cabinet 1008. The security sensors (e.g., see 1140 in FIG. 3) can be configured to detect access to the interior of the gaming machine 1002. For example, the sensors can be configured to detect when the locking mechanism 1016 is actuated, the door 1016 is opened or a locking mechanism associated with the gaming machine controller enclosure is actuated. A power source, separate from an external power supply, such as a battery can be provided which allows the security sensors to operate and be monitored when the external power supply is not connected.

In particular embodiments, the cabinet 1008 can have a sheet metal exterior designed to provide the rigidity needed to support top boxes, such as 1010 and light kits as well as to provide a serious deterrent to forced entry. For example, the sheet metal can be sixteen gauge steel sheet. Additionally, the door, such as 1014, can be backed with sheet steel in the areas around the displays. Other materials, such as wood, wood composites, can be incorporated into the cabinet and the example of sheet metal is provided for the purposes of illustration only.

A speaker, such as 1020a or 1020b, can be protected by a metal screen. In one embodiment, a speaker, such as 1020a or 1020b, can be a subwoofer speaker. In general, a sound system associated with the gaming machine 1002 can include an audio amplifier and one or more speakers of various types, such as subwoofers, midrange speakers and tweeters.

If the main cabinet 1008 is entered, a "DOOR OPEN TILT" can be displayed halting game play and causing a "DOOR OPEN" event to be sent to the slot accounting system in 1004. In one embodiment, this message can be displayed on the main display 1018. These events can also be stored to the power hit tolerant memory. Upon door closure, the "DOOR OPEN TILT" will be replaced with a "DOOR CLOSED TILT" that can clear after the completion of the next game cycle. Additionally, a logic "DOOR OPEN TILT" can occur if the logic door is opened. The logic door is configured to be lockable independent of how the switch wiring is installed. The gaming machine 1002 can be configured to initiate the logic DOOR "OPEN TILT" regardless of whether or not a lock is installed on the logic door.

The displays 1018, 1012 and 1026, the speakers 1020, the printer 1022, the bill acceptor 1024, the card reader 1028 and the button panel 1030 can be used to generate a play of a wager-based game on the gaming machine 1008. Further, the display 1018 can include a touchscreen. The touchscreen can be used to provide inputs used to play the wager-based game. Some examples of wager-based games that can be played include but are not limited to slot games, card games, bingo games and lottery games. The wager-based games are typically games of chance and utilize a random number generator to determine an outcome to the game.

In general, the wager-based games can be classified as Class II and Class III games. Class II games can include bingo, pull tabs, lottery, punch board, tip jars, instant bingo and other bingo like games. Class III games can include but are not limited to slot games, black jack, craps, poker and roulette.

As described above, the wager-based game can be a slot game. The play of the slot game can involve receiving a wager amount and initiating a start of the wager-based game. A selection of a wager amount and a start of the wager-based game can be performed using buttons, such as 1032 and 1034, on button panel 1030. In addition, the button panel can be used to perform gaming functions, such as selecting a number of lines to play in a slot game, selecting the amount to wager per line, initiating a cash-out and calling an attendant. These functions will vary for different types of games.

In some embodiments, a touch screen can be provided over one or more of the displays, such as 1012, 1018 and/or 1026. The combination of the display and touch screen can be used to perform gaming functions that performed using the button panel 1030. Also, display and touch screen can be used to perform operator features, such as providing a game playback or a hand pay.

The play of wager-based game, such as a slot game, can involve making a wager and then generating and outputting a game presentation. The bet amount can be indicated in 1042. The game presentation can include a number of game features that vary from game to game. The game features provide variety in how the outcome to the wager-based is presented. For example, an award to the outcome of the game can be presented in a series of steps that vary from game to game. In some instances, a portion of the total award for a game can be awarded in each step. The steps and their graphical presentation can be referred to as game features. In various embodiments, information associated with one or more of the steps can be stored to a power hit tolerant memory. The power hit tolerant memory is discussed in more detail with respect to FIG. 2.

As an example, a portion of a slot game outcome presentation is shown on display 1018. The slot game outcome presentation can include displaying a plurality of symbols, such as 1038. During the game outcome presentation, the symbols can appear to move on the display 1018. In addition, symbols can move off the display and new symbols can appear on the display.

Different combinations of symbols can appear on the display for some period of time, which varies for each instance of the wager-based game that is played. At the end of the presentation, the symbols reach a final position and an award associated with the game outcome is presented on the display. The total award for the game can be indicated in 1044 and the total credits available on the gaming machine after the award can be indicated in 1040.

In particular embodiments, a portion of the award to the outcome of the game can be presented as a bonus game. The portion of the award can be referred to a bonus award. The presentation of the bonus award can also be presented in steps where a portion of the bonus award is awarded in each step. These steps can be referred to as bonus game features. In some embodiments, information associated with the steps in the bonus game can be stored to the power hit tolerant memory. In various embodiments, components of the bonus game presentation can be presented on one or more of display 1018, 1012 and 1026.

When a wager-based game is not being played on the gaming machine 1002 in a game play mode, the gaming machine can enter into an attract mode. In an attract mode, graphics can be output on one or more of displays 1018, 1012 and 1026, which are designed to draw a player's attention to the gaming machine 1002. In addition, the gaming machine can output sounds as part of an attract mode.

In particular embodiments, as will be described in more detail below with respect to FIGS. 4, 5 and 6, display attributes, such as brightness and contrast, can be actively controlled on one or more 1018, 1012 and 1026. The display attributes can be controlled in accordance with states which occur during various operations modes of the gaming machine 1002, such as an attract mode, a game play mode or a tilt mode. For example, in an attract mode, a display, such as 1018, can be made to appear brighter to further draw a player's attention to the gaming machine 1002. However, in a game play mode, to reduce eyestrain, the brightness of the display can be reduced.

Next, with respect to FIG. 2, further details of the network services 1004 and gaming machine operations are described. In FIG. 2, another embodiment of a gaming system 1050 is shown. Gaming system 1050 includes three banks of gaming machines, 1052a, 1052b and 1052c. For the purposes of illustration, three gaming machines are shown in each bank.

The network services 1004 includes a central determination server 1054, a local progressive server 1056, a wide area progressive server 1058, a player tracking/slot accounting system server 1060 and ticket-in/ticket-out (TITO) server 1062. In gaming system 1050, all of the gaming machines in each bank, 1052a, 1052b and 1052c, are connected to the slot accounting system server 1060 and the TITO server 1062. However, only the gaming machines in bank 1052a are connected to the central determination server 1054. Further, only gaming machines in bank 1052b and display 1068 are connected to the local progressive server 1056. Finally, only the gaming machines in bank 1052c are connected to the wide area progressive server 1058. The communication connections between the gaming machines in each bank and the servers 1054, 1056, 1058, 1060 and 1062 can be wired connections, wireless connections or combinations thereof.

In various embodiments, the central determination server 1054 can be used to generate a portion of the game played on the gaming machines in bank 1052a. For example, the central determination server 1054 can be used to generate random numbers used to determine outcomes to the games played in bank 1052a. In another example, the central determination server 1054 can be used to generate all or a portion of the graphics used to play the games on the gaming machines in bank 1052a. For instance, the central determination server 1054 can be configured to stream a graphical presentation of a game to a gaming machine, such as 1064. The graphical presentation can be output to a display on the gaming machine.

In one embodiment, the central determination server 1054 can be used to generate numbers used in a bingo type games played on the gaming machine in bank 1052a. These bingo type games are often referred to as class II games whereas traditional slot machines are referred to as class III games. In class II games, a draw of numbers is made. The numbers can be mapped to a bingo card, which the player purchases to play the bingo game. The draw of numbers can result in at least one winning game combination on the bingo cards participating in the current bingo game.

The central determination server 1054 can be configured to repeat the number draws for the bingo games at regular intervals. For example, number draws can be repeated every 20 milliseconds. Players at the various gaming machines coupled to the central determination server 1054, such as the players at the gaming machine in bank 1052a, can initiate bingo games which utilize the bingo numbers from a particular bingo number draw. The bingo numbers in the number draw can be mapped to a bingo card displayed on the screen of the gaming machine, such as 1064.

Wins can be indicated by a winning pattern on the bingo card, such as four in a row or four corners. In response to a winning pattern on a bingo card on a particular gaming machine, the central determination server 1054 can send a prize amount associated with the win to the gaming machine with the winning pattern. This prize amount can be displayed on the gaming machine and the credits associated with the prize amount can be deposited on the gaming machine. For example, win of a bingo game on gaming machine 1064 can result in a prize amount being displayed on the main display. Further, the prize amount can be deposited as credits on the gaming machine 1064 such that the credits are available for additional game play.

In one embodiment, the prize amount can be output to look like a slot game. For example, if the prize amount is ten credits. Video reels can be displayed spinning on a main display of the gaming machine and a reel combination associated with a ten credit win in a slot game can be output to the display screen. If the outcome to the bingo game on a particular gaming machine is no award, then the video reels can be displayed spinning and a reel combination associated with no award in the slot game can be displayed on the gaming machine. This process can be repeated on various participating gaming machines, as number draws for various bingo games are initiated and completed on the central determination server 1054.

The local progressive server 1056 can be used to generate one or more progressive prizes that are limited to a local group of gaming machines, such as only the gaming machines in bank 1052*b*. When games are played on the gaming machine in bank 1052*b*, an amount of each wager can be contributed to one or more progressive prizes. The local progressive server can receive the contribution amounts from the gaming machines linked to the progressive game and can keep track of the prize amounts associated with the one or more progressive prizes. The prize amounts for the one or more progressive prizes can be output to displays on the participating gaming machines as well as to separate displays near the participating gaming machines.

The local progressive server 1056 can be configured to receive information regarding gaming events on the participating gaming machines. For example, the local progressive server 1056 can be configured to receive a notification from each of the participating gaming machines when a game outcome has occurred associated with a win of a progressive prize. In other examples, the local progressive server can be configured to receive gaming information, such as when each game is played on one of the participating gaming machines, an amount of wagered for each game and when one or more type of game outcomes occur on each of the gaming machines.

The gaming information associated with gaming events on the one or more gaming machines can provide a basis for additional bonus scenarios. For example, a bonus award can be triggered on one of the gaming machines after a random number of games are played on the gaming machines as a group. As another example, a bonus award can be triggered on one of the gaming machines after a particular game outcome occurs a random number of times on the participating gaming machines as a group, such as a particular combination of symbols appearing a random number of times.

The wide area progressive server 1058 is connected to the gaming machines in bank 1052*c* and display 1068. The wide area progressive server 1058 can be used to enable a progressive game played on gaming machines distributed over a wide area, such as multiple casinos distributed within a state. Similar to the local progressive server 1058, when wagers are made, the wide area progressive server 1058 can receive contributions to the progressive prize from the participating gaming machines. The wide area progressive server 1058 can report these contributions to a remote device which tracks the total progressive jackpot. Further, if a progressive jackpot is won on one of the gaming machines to which it is connected, the wide area progressive server 1058 event can be reported to the remote device. Yet further, the wide area progressive server 1058 can receive a current progressive jackpot amount from the remote device. The current progressive jackpot amount can be reported on displays on the gaming machines participating in the progressive jackpot and/or nearby signage, such as 1068.

The display 1068 can have a digital sign controller 1070. The digital sign controller 1070 can have a network interface which allows it to communicate with a remote device, such as the wide area progressive server 1058. In this example, the digital sign controller 1070 can be configured to output information to display 1068 associated with the progressive game, such as a current jackpot amount.

In general, displays with digital sign controllers can be provided through out a gaming environment, such as casino. The digital sign controller, such as 1070, can be configured to communicate with a remote device. The remote device can be configured to send information to the digital sign controller to output to a display. The information can include video, audio and picture data. Further, the remote device can be configured to send commands to the display, such as a command to output information to the display.

The slot accounting system portion of server 1060 can receive accounting information from each of the gaming machine in system 1050, such as an amount wagered for each game and amounts awarded on each gaming machine. The server 1060 can also receive information which uniquely identifies each gaming machine including a machine ID number and a current game being played on the gaming machine. The accounting information can be used for auditing purposes.

The player tracking system portion of server 1060 can track the game play of individual users. For example, a player can input account information into one of the gaming machines that is associated with a player tracking account that has been previously set-up. Based on the account information, a particular player tracking account can be located. The player tracking account can include information which identifies an individual user, such as user 1062 (User 1062 can be playing games at one of the gaming machines in bank 1052*a*.). The player tracking account information can include a player's name, address, phone number, gender, etc.

In one embodiment, a player, such as user 1062, can insert a player tracking card in a card reader (e.g., see card reader 1022 in FIG. 1). The card reader can read player tracking account information from the player tracking card, such as on a magnetic strip on the card, and send the information to the player tracking/slot account system server 1060. Based upon the received player tracking account information, the player tracking system portion of server 1060 can locate a player tracking account.

The player tracking account information can be input via other means on the gaming machine. For example, as shown in FIG. 1, the gaming machine 1002 may be able to communicate with a mobile device, such as 1006. Thus, in one embodiment, the gaming machine 1002 may be configured to directly receive player tracking account information from a mobile device. In another embodiment, the gaming machine 1002 may be configured to generate an input interface on a touch screen display that allows a player to input player tracking account information.

After the player provides account information and an account is located, the player tracking system can enter accounting information associated with a player's game play into the identified player tracking account, such as an amount wagered over time. As described above with respect to FIG. 1, the accounting information associated with a player's game play can provide a basis for awarding comps to the player. For example, based upon a player's previous game play, the player tracking system portion of server 1060 can send an amount credits to the gaming machine on which the player is playing. In another example, the player tracking system portion of server 1060 can send a command to a printer (e.g., see 1022 in FIG. 1) on the gaming machine on which the player is playing to print out a ticket. The ticket can be redeemable for goods or services or a discount on goods or services, such as a free meal or discount a meal.

As described above, each of the gaming machines can be coupled to a ticket-in/ticket out (TITO) server 1062. TITO server 1062 can be used to generate and validate instruments associated with a credit and/or cash value. One example of an instrument, which can be generated and validated, is a printed ticket. Another example is a digital instrument, such as a printed ticket stored in a digital form. In one embodiment, a digital instrument can be stored on an electronic device carried by a user, such as a mobile device carried by user 1062.

As an example, when a printer, such as 1022, is employed in a "cash out," the gaming machine controller (e.g., see 1160 in FIG. 3) can contact a TITO server (e.g., see 1062 in FIG. 2) with a cash out amount. In response, the TITO server can generate a unique number, associate the unique number with a value and send the gaming machine a unique number. The unique number can be sent to a printer (e.g., see printer 1022 in FIG. 1). Then, the printer can print a ticket with the unique number, such as a unique number encoded in a bar-code, and a value of the ticket, such as five dollars.

When the ticket is later presented for redemption, the unique number can be used to validate the ticket. For example, the user 1062 can "cash out" at a first gaming machine, such as 1064 in bank 1052a, and receive a printed ticket with a unique number generated by the TITO server 1062. Then, the user 1062 can go to a gaming second gaming machine, such as 1066 in bank 1052c, and insert the ticket into a bill acceptor (e.g., see 1024 in FIG. 1). The second gaming machine 1066 can contact the TITO server 1062 and send the ticket information, i.e., the unique number read from the ticket, to server 1062. Then, the server 1062 can validate the ticket and send back to the second gaming machine 1066 an amount of credits to deposit on the second gaming machine. The deposited credits can be used for additional game play.

In these examples, the servers can include processors, memory and communication interfaces. Various gaming functions are associated with each of the servers, 1054, 1056, 1058, 1060 and 1062. The described distribution of gaming functions is for the purposes of illustration in only. In alternate embodiments, combinations of gaming functions can be combined on the same server or repeated on different servers. For example, the central determination server 1054 can also be configured to provide a local progressive to the bank of gaming machine 1052a. In another example, the local progressive server 1056 can be configured to provide a number of different progressive prizes for different groups of gaming machines. In yet another example, the player tracking system portion of server 1060 can be configured to provide bonusing features at each of the gaming machines.

In FIG. 2, while gaming machines, such as 1064 or 1066, are operational, a user 1062 can engage in game play. Under some conditions, such as tilt conditions, game play can be suspended and an intervention by an operator, such as 1064, may be required. An operator intervention may require an operator, such as 1065, to be directly present at a gaming machine, such as 1064. For example, the presence of an operator may be required to access an interior of the gaming machine to clear a tilt condition. In other examples, an operator may be able to clear a tilt condition from a remote location via a communication connection with the gaming machine.

In one embodiment, during game play, the gaming machine can award an amount above some threshold amount. Prior to receiving the award, an operator, such as 1065, can be sent to the gaming machine to have the player fill out a form for tax purposes. In the United States, this tax form is referred to as a W2G form. In addition, the operator may verify that the gaming machine was operating properly when the award was made prior to the player receiving the award. For example, if the gaming machine indicates a progressive jackpot has been won, the operator may check to verify the gaming machine was operating properly. In a hand pay, the operator, such as 1064, may provide an instrument redeemable for the jackpot amount.

As described above and in more detail with respect to FIGS. A, C and D, an operator, such as 1064, may be required to be physically present at a gaming machine, such as 1064 and 1066, to clear a tilt condition. For example, to clear a tilt condition, the operator, such as 1065, may have to access an interior of a gaming machine to clear a paper jam in a printer or a bill acceptor (e.g., see printer 1022 and bill acceptor 1024 in FIG. 1). In another example, to clear a tilt condition, the operator 1065 may have to access an interior of the gaming machine, such as 1064, to add more tickets to a ticket printer or empty a note stacker associated with the bill acceptor. For some tilt conditions, the gaming machine operator 1064 may access a menu output on a main display of the gaming machine, such as 1064 or 1066, to perform a RAM clear. RAM clears are described in more detail below with respect to FIG. 3.

Figure 3:
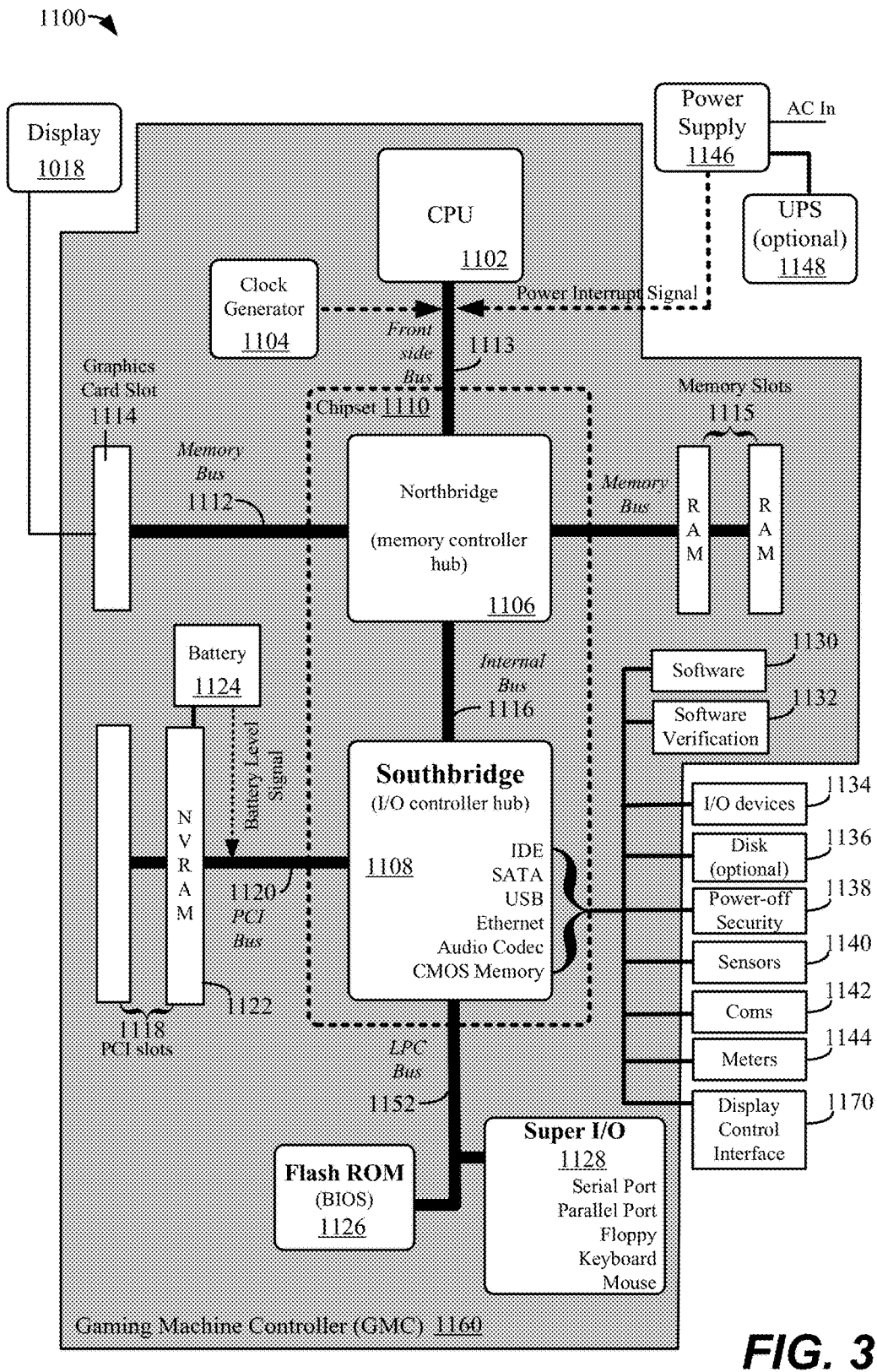
FIG. 3 illustrates a block diagram of gaming machine components including a gaming machine controller in accordance with embodiments of the present invention.

Next, details of the gaming machine controller that is used to control the play of the wager-based game including generating the game presentation and controlling the various gaming devices is described with respect to FIG. 3. FIG. 3 illustrates a block diagram of gaming machine components including a gaming machine controller (GMC) 1160. The GMC 1160 can be coupled to a power supply 1146, display 1018, I/O 1134 devices, external memory, such as a disk drive 1136, a power-off security device 1138, security sensors 1140, communication interfaces 1142, meters 1144 and a display control interface 1170.

In one embodiment, as described in more detail below with respect to FIG. 4, the display control interface (DCI) can allow the GMC 1160 to communicate with one or more displays, such as 1018. Via the DCI 1170, the GMC 1160 can control display attributes, such as brightness and contrast. In particular embodiments, the display attributes can be changed in response to different states that occur during various gaming machine operational modes, such as a tilt mode, a game play mode and an attract mode.

The power supply 1146 can provide a DC voltage to the GMC 1160. The power supply can also provide power to the other devices in the gaming machine cabinet, such as I/O devices. Typically, the power supply 1146 is configured to receive power from an external power source, such as an AC voltage source. In some embodiments, an uninterruptable power supply (UPS) 1148 can be coupled to the power supply 1146. The UPS 1148 can be configured to provide back-up power for some time period in the event external power is lost.

In a particular embodiment, the UPS 1148 communicates with the GMC 1160 on boot up and periodically to indicate power status and battery capacity of the UPS. If the UPS 1148 is not operational, this communication will fail and the game will display a soft tilt on the main game display, such as 1018, indicating that the UPS is not available. Under normal circumstances the UPS 1148 functions to condition the input power and ensure that the UPS battery remains fully charged. However, upon a power failure, the UPS 1148 in conjunction with the game platform will take one of two paths depending on the state of the UPS battery, which are described as follows.

If a power fail occurs and the UPS battery is more that 50% charged the GMC 1160 can immediately determine if there are credits on the machine (The threshold level can be a different percentage). If the game has no credits, the GMC 1160 can immediately hard tilt and become unplayable. The GMC 1160 can continue to run on battery power until either the battery level passes below 50% or power is restored to the game. If power is restored, the hard tilt is cleared and the gaming machine can become playable again.

If credits are on the machine, the GMC 1160 can allow game play to continue until the battery level reaches 50% charge. At that point, the GMC 1160 can complete a game in progress, cash out the player and begin an orderly shutdown. Allowing game play prior to shutting down allows the player to complete a game in progress and continue to remain on the game for a small period of time in case power is restored quickly. This keeps the game from tilting and the GMC 1160 cashing out the player for momentary glitches in power. It also allows some time for backup generators to come on line for a more serious power outage.

The power-off security 1138 can be configured to monitor the security sensors 1140 while power is off to the gaming machine, such as during a power failure or shipping. The power-off security 1138 can include its own processor, memory and power supply, such as a battery. The power-off security device 1138 can report detected problems while the power was off to the GMC 1160 after power is restored. In some instances, a detected problem can cause a tilt condition. For example, a detected door open condition while the power was off may cause a tilt condition which has to be cleared by an operator. As another example, if the GMC 1160 can't detect the power-off security 1138, then the gaming machine can tilt.

The I/O devices 1134 can include the gaming devices that provide the external interface that allows the wager-based game to be played on the gaming machine. Examples of these gaming devices are described above with respect to FIG. 1. In some embodiments, a memory device 1136, such as disk drive or flash drive, can be provided. As will be described in more detail below, the memory device 1136 can be used as a power hit tolerant memory (PHTM) or used to receive crucial data from another PHTM.

The communication interfaces 1142 can include wired and wireless communication interfaces, which use communication protocols, such as but not limited to Ethernet, Bluetooth,™ Wi-Fi, and NFC. An example of a wireless communication interface 1046 is shown in FIG. 1. The remote servers can provide network services 1004 as described above with respect to FIG. 1. The communication interfaces can be used to communicate with remote devices, such as remote servers, mobile devices in proximity to the gaming machine or other gaming machines. The GMC 1160 can be configured to support a variety of communication protocols over these communication interfaces.

In one embodiment, communications can be carried out with a back-end slot accounting system (SAS) (e.g., see network services 1004 in FIG. 1). The SAS protocol uses a CRC to ensure the integrity of messages going to and from the host. All type S, M, and G Long polls are CRC'd over the entire package including the address and command byte. The SAS engine can be configured to isolate the gaming code from the external communications. The SAS engine can be configured to only accept correctly formed SAS messages. Malformed, invalid or incorrect messages can be summarily dropped.

Messages that are valid can be translated into requests for the game player. The result of the message translation can be two-fold. First, the message is parsed and then evaluated for correctness and validity. If the message does not meet this criterion, it may not be translated and forwarded to the game player for a response, such as on display 1026 in FIG. 1. Second, no command, request or message from the external communication interface ever reaches any further than the SAS engine. This process ensures that erroneous signals or data will not adversely affect the game.

The meters 1144 can include hard meters, which are mechanical devices and meters maintained in software by the GMC 1160. In one embodiment, electronic digital storage meters of at least 10 digits that accumulate and store all the meters required can be used. For example, the number of games played since RAM clear can be accumulated. In a RAM clear critical memory can be cleared of data. Further, the number of games since the last power-up can be accumulated. As another example, games since the last door close can be accumulated.

Some other functions which may be tracked by a physical or software meter include but are not limited to attendant paid jackpots, attendant paid cancelled credits, bill in, voucher in (e.g., credit voucher), voucher out, electronic fund transfer in, wagering account transfer in, wagering account transfer out, non-cashable electronic promotion in, cashable electronic promotion in, cashable promotion credits wagered, non-cashable electronic promotion out, cashable electronic promotion out, coupon promotion in, coupon promotion out, machine paid external bonus payout, attendant paid external bonus payout, attendant paid progressive payout, machine paid progressive payout, non-cashable promotion credits wagered, number of progressives won, number of jackpots won, number of games won, number of games lost and total amount paid by attendant. Other meters can include main door open, logic door open, cash door open and stacker door open.

In a particular embodiment, software meters can be accessed from an operator menu by turning a key on the side of the gaming machine. The operator menu can be output on display 1150. All software meters can be cleared upon a RAM clear. In addition to the meters, the machine can also display the configured denomination, theoretical payout and actual payout. This information is accessible from the operator menu under the statistics screen. This information can be cleared upon a RAM clear event.

The GMC 1160 is secured within an interior of the gaming machine. The GMC 1160 can be contained in a metal box. The metal box can include an entry, such as a hinged door, that is lockable. The openings for cables and wiring in the metal box can be purposefully designed to be as small as possible while still allowing proper electrical wiring standards regarding bend radius and connector strain. The locking mechanism for the metal box can be monitored by one of the sensors 1140.

The GMC 1160 can include a motherboard. The motherboard can be the only circuit card that contains control programs. Other gaming devices, such as the I/O devices 1134, can include device specific control programs. However, these device specific control programs don't affect or alter the behavior of the control programs on the motherboard.

The mother board can include a chipset 1110. The chipset 1110 can include a northbridge 1106, which is a memory controller hub, and a southbridge 1108, which is an I/O controller hub. The northbridge 1106 and the southbridge 1108 can communicate via an internal bus 1116.

The northbridge 1106 can be coupled to a memory bus 1112 and a front side bus 1113. The front side bus 1113 can couple on or more processors, such as CPU 1102, to the northbridge 1106. The CPU 1102 can receive clock signals from clock generator 1104 via the front side bus 1113.

The memory bus 1112 can couple one or more graphics cards, which include graphical processing units (GPUs), to the northbridge 1106. The graphics card or cards can be installed in the graphics card slot(s). The graphics cards can be coupled to displays, such as display 1018. Further, the memory bus 1112 can couple one or more memory slots 1115, configured to receive volatile random access memory, to the northbridge 1102. The CPU 1102 can communicate with the volatile memory in the memory slots 1115 and the graphics card in the graphics card slot 1114 via the memory bus 1112 and the front side bus 1113.

The southbridge 1108 can be coupled to one or more PCI slots 1118 via PCI bus 1120. In various embodiments, the southbridge 1108 can provide a variety of communications interfaces. The communication interfaces include but are not limited to IDE, SATA, USB, Ethernet, an audio Codec and CMOS memory. In addition, the southbridge can communicate with a flash ROM (BIOS) 1126 and super I/O 1128 via the LPC (Low Pin Count) bus 1152. Typically, super I/O 1128 supports older legacy devices, such as a serial port (UART), a parallel port, a floppy disk, keyboard and mouse. Some of the gaming devices, such as the sensors 1140, can be coupled to the southbridge 1108 via super I/O 1128.

The GMC 1160 can be configured to execute gaming software 1130 to control play of a wager-based game. On boot-up, software verification 1132 can be performed using logic stored on the BIOS 1126. In some instances, the logic can also be executed on the BIOS. In a particular embodiment, separate hardware device can be installed which includes verification algorithms. The separate hardware device can be coupled to the southbridge.

In one embodiment, the gaming software 1130 can be stored on two compact flash cards, which are not conventional ROM devices. The verification mechanism can be an SHA-1 hash, which produces a message digest of some length, such as one hundred sixty bits. Message digests can be stored on both compact flash memories and a public/private key algorithm with a key of some length, such as a 512-bit key, can used to encrypt and decrypt the message digests. If any errors are detected in the validation, the GMC 1160 can tilt and halt execution. The GMC 1160 can be configured to prevent programs deemed to be invalid from running.

When the software 1130 is built, it can be hashed using a hash algorithm, such as an SHA-1 hash algorithm. Other hashing algorithms can be used and SHA-1 is provided for illustrative purposes only. The resulting hash answers can form the hash digest. This digest, along with the start and stop values for the validation algorithm, can be encrypted a private key. The key can be stored in a computer which is not connected to any network and which is physically stored in a secure location, such as a locked safe.

In one embodiment, prior to use, the public key can be installed in a power-hit tolerant memory, such as the NVRAM 1122 on the motherboard. This step can be performed when the gaming machine is manufactured. In another embodiment, the public key can be loaded from a memory device, such as a USB device, in the field. In one embodiment, the USB port is only accessible when the enclosure which holds the GMC 1160 is opened. Without a proper public key, the machine will not operate.

When the game initially powers up, the BIOS 1126 can run a Power On Self-Test (POST) and checksum over itself. If these tests fail, the game does not boot and an operator can be required to clear this tilt. If the BIOS self-test passes, the BIOS can retrieve the public key from NVRAM 1122 and can run a CRC over it to ensure it is the correct key. The correct CRC answer can be stored on the BIOS. If the public key does not exist or if the public key CRC returns an incorrect answer, the game can halt and prompt the user to install the correct public key.

Once the public key is validated, the BIOS 1126 can decrypt the SHA signatures for the data stored on the system compact flash 1130 and the start and stop sectors indicating where the data is stored on the compact flash. The data can be stored between the start and stop sectors, inclusive. Unused sectors can be set to 0 (zero). The BIOS 1126 runs a low-level block-by-block SHA-1 hash over the kernel and operating system (Boot and Root) partitions and compares the result to the decrypted file from the manifest. In one embodiment, the operating system can be Linux and the kernel can be a Linux kernel. If the hash values do not match, the game tilts.

If the values match, the BIOS 1126 can load the boot loader program and can relinquish control of the validation process to the boot loader. The boot loader can be executed by the operating system using CPU 1102. The procedure can validate the entire partition, not just the file structure. Thus any unused or unallocated areas of the partition can be tested for unintended programs or data.

Next, a file-by-file SHA-1 can be performed over the paytable, assets, and player files. The resulting information can be compared against the decrypted results from the manifest file. If the calculated answers match the decrypted answers, the GMC will proceed with the boot-up. If the hash answers do not match, the game tilts and requires operator intervention to clear.

In one embodiment, as an additional security measure, a compressed file system that is designed to be read-only can be used. The file system may not support or contain a write command or the ability to write to a file. The file system can be compressed so that it is not human-readable.

Each block of data in the file system can have a corresponding CRC stored with the block. When the block is read, the CRC is calculated and compared with the stored CRC. If the answer does not match, the file system can generate an error and the game tilts. Any changes, whether additions, deletions, or modifications, will change the CRC of the affected blocks and cause the game to tilt. This feature, in effect, monitors the integrity of the entire file system as well as the integrity of the media on a real-time basis.

These SHA hash answers can be available on-screen and may also be accessed via the Gaming Authentication Terminal (GAT) interface. The GAT interface (not shown) can be provided as one of the I/O devices 1134 or within the super I/O 1128. The GAT interface can be configured to allow an operator to initiate an SHA-1 hash or an HMAC SHA-1 on-demand so that an operator (or other independent entity) can validate the integrity of the software 1130 at any time. In one embodiment, a nine-pin "D" connector is available to an operator or regulator for access the GAT serial terminal.

Access to the GAT port requires opening of the main door. Further, it may require unlocking of the GMC enclosure. In one embodiment, a GAT port can be provided on the outside of the GMC enclosure. Hence, the GMC enclosure can remain locked while the GAT port is utilized.

As described above, the gaming machine can include a power hit tolerant memory (PHTM). For example, NVRAM 1122 coupled to battery 1124 can be used as a PHTM. The PHTM can be used to store crucial data, such as data generated during the play of a wager-based game. The PHTM can be configured to be able to quickly write the crucial data in response to a detection of an imminent power interruption. The CPU 1102 can be configured to detect a potential power interruption via the power interruption signal received from the power supply. The power interruption signal can indicate a fluctuation in the power.

Not all memory types are suitable for use as a PHTM because their write times are not fast enough to store data between the detection of a potential power interruption and the power interruption. For example, disk drives don't typically have fast enough write times for use as a PHTM. In one embodiment, a disk drive 1136 can be used. However, it requires that use of an uninterruptable power supply coupled to the disk drive 1136 and GMC 1160 to maintain power after the external AC power source is lost. Other types of memory with slower write times can be employed when an uninterruptable power supply is used.

Typically, a volatile RAM (random access memory) has a fast enough write speed to be used as a PHTM. However, after the power is lost, data stored in the volatile RAM is lost. To overcome this deficiency, a battery, such as 1124, can be coupled to the RAM 1122 to provide persistence memory storage. This memory configuration can be referred to as a non-volatile RAM (NV-RAM). The battery power levels can be monitored so that it can be replaced as needed.

In one embodiment, an NVRAM 1122 with a battery 1124 is shown inserted in one of the PCI slots 1118. The NVRAM 1122 can be used as a PHTM. In other embodiments, it may be possible to use a RAM inserted into one of the memory slots 1115 that is coupled to a battery. It yet another embodiment, it may be possible to use a high-speed USB connection to a memory storage device to provide a PHTM. As noted above, a hard disk, such as 1136, in combination with an uninterruptable power supply 1148 can be used as a PHTM.

In yet other embodiments, a GMC 1160 may utilize multiple memory storage devices to store crucial data. For example, the NVRAIVI 1122 can be used as a PHTM. However, crucial data can be copied to a non-PHTM from the NVRAM 1122 as needed. The copied data can provide a back-up of crucial data stored in the PHTM. Further, after crucial data is copied from the PHTM and the validity of the crucial data is verified, it may be deleted from the PHTM to free up space.

In one embodiment, crucial data can be stored in an NVRAM chip and in a high speed read/write compact flash. Crucial data such as RNG outcome, game recall, game state (credits, wager, winnings), and meters can be stored in NVRAM as files. Each file is hashed (MD5 or SHA-1 depending on the file) and the hash answer can be stored with the file.

Additionally, in a particular embodiment, in NVRAM, the critical files can be kept in triplicate with each copy having a separate MD5 hash of the information. Prior to displaying each game outcome, this data can be rehashed and the three outcomes can be compared. If all three hash answers match, the data is deemed to be good and the game results are displayed to the player and a copy is stored in NVRAM. If two of the sets match, the non-matching set is deemed to be corrupt and it is replaced with a copy from one of the other two and the results are displayed to the player. If all three are different, memory can be deemed to be corrupt and a tilt can occur, halting play. The comparisons can occur continuously, each time the memory is updated, which may be multiple times during the course of a single play. However, a comparison can be performed at least once prior to displaying the game outcome.

To protect meters in the event of a power loss, various meters can be stored in NVRAM 1122. Thus, the meters are protected in the event of a power loss. The battery 1124 can be a lithium cell rated, based on the current draw of the NVRAM, to maintain the meters for at least 90 days. In one embodiment, the lithium cell can be rechargeable via the power supply 1146.

In particular embodiments, a game play history associated with recent games can be stored in the NVRAM 1122. This information can be retrieved from the NVRAM 1122 via an operator menu and output to a display, such as display 1018. In particular embodiments, a complete play history for the most recent game played and the nine prior games can be made available. A method involving game play history is described in more detail with respect to FIG. 11.

For a slot game, the game play history can include credits available, credits wagered, number of lines played (when appropriate), bonuses won, progressive won, game winnings (credits won) and credits cashed out. For "pick" bonuses, the intermediate steps involving the player picks can be retained. In games with free spins, the initiating game is retained with all or, for cases where more than fifty free games have been awarded, at least the last fifty free games played. This gaming information can be displayed in the recall screens through standard text meters, screen shots, graphical display elements and textual representations of specific situations that occurred during game play. The game play history can illustrate unique game play features associated with the game in general and specific game features that occurred during the instantiation of a particular play of the wager-based game.

Figure 6:
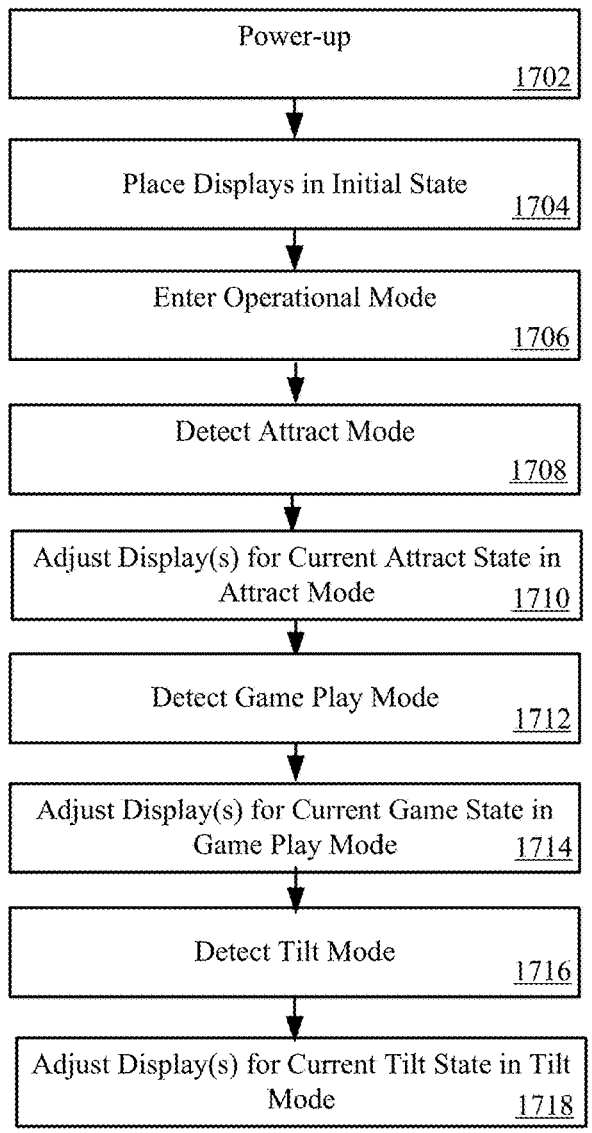
FIG. 6 illustrates a method of controlling one or more displays on a gaming machine in accordance with embodiments of the present invention.

Next, details of display control system are described with respect to FIGS. 4, 5 and 6. In a particular, FIG. 4 illustrates a block diagram of one embodiment of a display control system 1190, which includes two displays. The display control system 1190 allows display attributes to be adjusted by the gaming machine controller 1160 (see FIG. 3) on the fly via a direct connection to one or more displays. Some examples of display attributes include but are not limited to power on/off, input source selection, contrast control, brightness control and color temp control.

In particular embodiments, the GMC 1160 can adjust display attributes according to various gaming machine operational states which occur during a game play mode, an attract mode and a tilt mode. The graphics generated for each of the gaming machine operational states can be independent of the display attributes. Thus, the same graphics are generated whether the display is configured with a first set of attributes or a second set of attributes. However, the graphics associated with each gaming machine operational state can appear differently depending on the selected display attributes.

In the example of FIG. 4, two displays, 1018 and 1012 are shown (see FIG. 1). The primary game for a slot machine is output to the main display 1018. The secondary display 1012 is located in a top box of the slot machine 1002 (see FIG. 1). The secondary display 1012 can be used to show graphics associated with the primary game, advertising and attract features.

In one embodiment, displays 1018 and 1012 can be flat panel LCD displays. Other types of displays can be used and this example is provided for illustrative purposes only. Displays 1018 and 1012 can include one or more of buttons, a touch screen interface and a wireless interface which allow the display attributes to be manually configured. For example, brightness and contrast levels can be adjusted on the displays via the manual controls.

The displays 1018 and 1012 can be configured to each receive video signals from one or more sources. For example, a display, such as 1018, can receive one or more of HDMI video signals, DVI video signals, display port video signals, USB video signals or VGA video signals. In this example, display 1018 receives, via the video-in port 1176, a first video signal from a video adapter 1184 coupled to the GMC 1160. Display 1012, via the video-in port 1180, receives a second video signal from the video adapter 1184. The video adapter 1184 can be provided in the graphics card slot 1114 in FIG. 3. In general, a GMC 1160 can be configured to control video output to one or more displays on a gaming machine including generating graphics which are output to the display.

Typically, the manual control of a display involves displaying menus and graphics which allow settings to be selected and indicate information about current settings. For example, a bar with a number can be displayed when the brightness is being manually adjusted. The manual control features can be embodied in firmware on each of the displays, such as manual control 1172 and 1178.

When a wager-based game is being played on a gaming machine, adjustment of display properties via the manual control 1172 or 1178 is not acceptable because the menus and/or graphics can cover-up the graphics associated with a game. For example, it would not be acceptable to show a bar graph of a contrast value being adjusted over the game play graphics. Thus, another control interface can be provided on the displays, 1018 and 1012, without these features.

In FIG. 4, the GMC 1160 includes a display control interface 1170. The display control interface 1170 can provide control signals to one or more displays that allow the display attributes to be changed. The display control interface 1170 can be coupled to one or more displays via a serial interface, such as USB or RS-232. In 1190, as an example, the display control interface 1170 is coupled to display 1018 via gaming machine controller (GMC) interface 1174 using a USB connection. The display control interface 1170 is coupled to the display 1012 via GMC interface 1182 using a USB connection.

On the GMC 1160 side, the display control interface 1170 is coupled to display control logic 1188. The display control logic 1188 can be configured to monitor gaming machine operational states, such as game state 1186, and adjust display attributes in accordance with the operational state. For example, in an operational mode associated with an attract state, the display control logic 1188 can adjust a display attribute, such as increasing the brightness of the displays 1018 and/or 1012. In another example, when game play starts the display control logic 1188 can be configured to adjust a display attribute, such as lowering the brightness of the displays 1018 and/or 1012. In yet another example, during game play, when a bonus state occurs, the display control logic 1188 can be configured to change a display attribute, such as increasing the brightness of display 1018 and/or 1012. Then, the display control logic 1188 can lower the brightness once the bonus state ends. In yet another embodiment, when a player has won a large jackpot and a hand pay state occurs, the display control logic 1188 can be configured to adjust a display attribute, such as increasing the brightness of the display to highlight a jackpot. In yet a further example, during a tilt state, the display control logic 1188 can be configured to turn off one of the displays, such as a top box display.

Many such examples of changing display attributes are possible and the example of changing brightness is for the purposes of illustration only. Further, multiple display attributes can be changed in response to a detection of a change in game state. For example, the brightness and contrast of a display can be changed in response to a change in an operational state of a gaming machine. Other examples of display attributes, which can be changed, are described below with respect to FIG. 5.

In addition, a gaming machine, such as gaming machine 1002 (see FIG. 3), can include more than two displays. For example, a display can be associated with a player tracking unit. In addition, buttons can include displays. When the displays provide the proper supporting firmware, the display attributes of these displays can also be controlled by display control logic 1188 in response to changes in operational states of the gaming machine.

The display control logic 1188 can send commands to the displays, such as 1018 and 1012, which can change the display attributes. The commands can be implemented in firmware on the display. For example, direct control 1192 and direct control 1194 each support display commands which can be utilized by the display control logic 1188. In particular embodiments, the direct control 1192 and direct control 1194 can include firmware logic which allows the display commands to be implemented. Many different display commands and command sets are possible. An example command set is described as follows with respect to FIG. 5.

FIG. 5 illustrates a block diagram of a command structure for a display control system. In one embodiment, this command structure can be embedded in firmware in a display. For example, the firmware logic for the command structure can be incorporated into the direct control 1192 in 1018 and direct control 1194 in 1012. As described above, an interface, such as 1174 and 1182, can be provided on a display, which allows a gaming machine controller, such as 1160, to utilize the command set embedded in the display firmware. Using commands in the command set, the gaming machine controller can change attributes of one or more displays without generating any onscreen artifacts. As described above, the display control logic 1188 in the gaming machine controller 1160 can be configured to determine a current gaming machine operational state, a current display state including its attributes and whether or not to change display attributes for the current gaming machine operational state.

Next, a few example commands in a command set 1600 are described. In one embodiment, the commands can be accessed through an application program interface (API). The commands in command set 1600 are provided for the purposes of illustration and are not meant to be limiting. Using 1602, the GMC 1160 can turn on a display. For example, after a power cycle event, the GMC 1160 can switch on one or more displays. Using 1604, the GMC 1160 can place a display in a standby mode. For example, during a tilt event, the gaming machine can place one or more displays in a standby mode.

The displays, such as 1018 and 1012, can receive video input signals in different formats. Further, the displays can receive multiple video inputs signals. For example, a display can receive two HDMI signals or an HDMI signal and a DVI signal. Using commands, 1606, 1608 and 1610, the GMC 1160 can cause a display, such as 1018 and 1012, to output one a VGA signal, a DVI signal or an HDMI signal.

Further, the commands can cause the display to switch between input sources, such as switching from the DVI signal source to the HDMI signal source, where the display receives video content from both sources. In another embodiment, not shown, the commands can allow the GMC 1160 to switch between input sources of the same type, such as between two HDM input sources, where again the display can receive video content from both sources. For example, the GMC 1160 can switch from a first input source including graphics generated by the GMC 1160 to a second input source remotely generated, such as a live video feed from a remote source, where the first input source and the second input source can be of the same type or can be of a different type.

Using commands, 1612, 1614 and 1616, the GMC 1160 can adjust the contrast of a display. Contrast can refer to the difference in brightness between objects or regions in an image. When the contrast is changed, different colors tend to stand out more as the contrast value changes. Using commands 1612 and 1614, the GMC 1160 can step up or step down the contrast value by a single count. Typically, contrast values range from zero to one hundred. Alternatively, another increment value can be used with the command set, such as two, three, four, etc. The GMC 1160 may issue a series of commands to change the contrast value in a sequence of steps, such as sending command 1612 five times to increase the contrast five counts.

In another embodiment, using command 1616, the GMC 1160 can cause the display to take on a particular contrast value. In this example, the range is between zero and ninety nine. For example, the GMC 1160 can determine the current gaming machine operational state and in response, using command 1616, set a contrast value of fifty. Again, this can be done in multiple steps or a single step. For example, if the current contrast value for an operational state is thirty, using command 1616 repeatedly, the GMC 1160 can increment the contrast from thirty to thirty five, then forty, then forty five and then fifty or just use a single command and increment it directly to fifty from thirty.

Using commands, 1618, 1620 and 1622, the GMC 1160 can adjust the brightness of a display. Brightness brightens the entire screen and every color. It can refer to the overall lightness or darkness of the image. Generally, images with a lower brightness and less contrast reduce eye strain. Using commands 1618 and 1620, the GMC 1160 can step up or step down the brightness value by a single count. Alternatively, another increment value can be used, such as two, three, four, etc. The GMC 1160 may issue a series of commands to change the brightness value in a sequence of steps, such as sending command 1618 ten times to increase the brightness ten counts from its current value.

In another embodiment, using command 1622, the GMC 1160 can cause the display to take on a particular brightness value. In this example, the range is between zero and ninety nine. For example, using command 1622, the GMC 1160 can detect a particular state and in response set a brightness value of sixty. Again, this can be done in multiple steps or a single step. For example, if the current brightness value for an operational state is forty, using command 1622 repeatedly, the GMC 1160 can increment the contrast from forty to forty five, then fifty, then fifty five and then sixty.

As described above, in response to the current gaming operational state, the GMC 1160 can change a plurality of display attributes. For example, in response to detecting a new game state, the GMC 1160 can use command 1616 to set the contrast value of a display, such as 1018 or 1012. Then, the GMC 1160 can use command 1622 to set the brightness value of a display, such as 1018 or 1012. As described above, for a current game state, the display attributes of one or more displays can remain the same or one or more display attributes on a plurality of displays can be changed.

Using commands 1624, 1626, 1628 and 1630, the GMC 1160 can adjust the display color temperature values. The color temperature of a light source is the temperature of an ideal black-body radiator that radiates light of a color comparable to that of the light source. Color temperatures over 5000 K are called "cool colors" (bluish white), while lower color temperatures (2700-3000 K) are called "warm colors" (yellowish white through red). The NTSC and PAL TV norms call for a compliant TV screen to display an electrically black and white signal (minimal color saturation) at a color temperature of 6500 K.

Using commands 1626, 1628 and 1630, the color temperature can be adjusted to set values referred to as cool (e.g., one preset value between 2700-3000 K), warm (e.g., one preset value above 5000 K) or normal (e.g., a preset value of 6500 K). Using 1624, the GMC 1160 can set custom color temperature values. For example, a color temperature value between 2700K and 7000K can be selected using 1624.

Using command 1632, the GMC 1160 can reset a display to its factory setting values. The factory setting values can be encoded in the display firmware. Using command 1634, the GMC 1160 can request the current status of a display, such as whether it is on or in standby-mode. Further, the current display attributes, such as contrast value, brightness value and color temperature vale can be retrieved.

In some instances, the GMC 1160 can determine whether to change any of the display attributes and how much to change a display attribute based upon the setting values retrieved using command 1634. For example, if a new game state calls for a particular display attribute value and the GMC 1160 determines, via command 1634, that the display is already the desired value, then the GMC 1160 may not send out a command to change the display property. Alternatively, the GMC 1160 can send out a command to change the display properties without checking the current display attributes, such as a single command to set a display attribute value. If the new value is the same as the old value, then the display attribute can remain the same and the appearance of the video content on the display, such as the game graphics, can remain the same.

Some other display settings which can be included in a command set are as follows. In one embodiment, a command can be provided to adjust the refresh rate of a display. In another embodiment, a command can be provided to adjust a resolution of a display. In another embodiment, a picture mode can be selected on a display. In yet another embodiment, a tint can be selected on a display. In a further embodiment, for displays with backlights, a command can be provided to adjust the backlight. In yet a further embodiment, a command can be provided to adjust the sharpness of a display. Thus, the example command set in FIG. 5 is provided for the purposes of illustration only and is not meant to be limiting.

FIG. 6 illustrates a method 1600 of controlling one or more displays on a gaming machine. In 1702, the gaming machine can power-up. In one embodiment, the displays can be switched on and allowed to initialize with factory setting values. In another embodiment, in 1704, one or more displays can be placed in an initial state. The initial state of a display can be on or in a standby mode. Then, initial display attribute values can be set, such as contrast, brightness and/or color temperature values.

In 1706, the gaming machine can enter operational mode from a power-up or tilt mode. The display attributes for can be the same or different than the initial display attributes set in 1704. In an operational mode, the gaming machine is ready for game play.

In 1708, an attract mode can be detected. The gaming machine can enter an attract mode after the gaming machine remains idle for some amount of time without game play occurring. In 1710, one or more display attributes can be adjusted based upon a current attract state. Different attract states are possible. Thus, different display settings can be used depending on the attract state. For example, a first set of display settings can be selected for a first attract state and a second set of display settings can be used for a second attract state. Further, one display can be adjusted for a first attract state while multiple displays, such as two or more, can be adjusted for a second attract state. The display settings can be adjusted using direct commands from the GMC 1160 (see FIG. 4) to the display. Examples of adjusting display settings are described above with respect to FIGS. 4 and 5.

In one embodiment, after the end of an attract state is detected, the displays can be returned to display setting values used during game play. In another embodiment, in 1712, the gaming machine controller can detect that a game play mode has been initiated. For example, a deposit of credits can be detected on the gaming machine. In 1714, in response, one or more display attributes can be adjusted for the current game state associated with the game play mode. During game play mode, these attributes can be adjusted during game play from game state to game state. For example, display attributes can be adjusted when a game state involving play of a bonus game occurs and then adjusted again when the play of the bonus game ends.

In one embodiment, short-term and long-term game play display settings can be provided. For example, during the attract mode, the displays can be made brighter to attract players. Then, the attract state can end and game play can start. Initially for some first threshold value, such as five minutes, one or more displays can remain the same brightness during game play as during the attract state. Then, after first threshold value is exceeded, the displays attributes can be immediately adjusted or gradually adjusted over some time period, to set a new baseline set of display attributes.

The adjustments can be made to reduce player eye strain as the player plays for longer periods of time. During game play, the display settings can be adjusted, such as made brighter and then less bright. However, as long as a game play session continues, the displays can be returned to the long-term play baseline display attribute settings. These baseline settings can be reset when a game play session ends, such as when a player cashes out of the gaming machine. For example, when a player cashes out, the display attributes can be changed from long-term play settings to attract state settings.

In 1716, a tilt mode can be detected. In 1718, in response, one or more display attributes can be adjusted. For example, a first set of display attributes can be used during a hand pay. In particular, one or more displays can be made brighter to highlight the award of a large jackpot which is being distributed via a hand-pay. In another example, during a dispute resolution process, previously played games can be redisplayed. In this instance, the displays can be adjusted so that the display attributes match the original values from when the game was first displayed. Thus, the player disputing the result because the game looked different when it was originally displayed can be avoided.

FIG. 7 illustrates a block diagram of examples of gaming software 1130 that can be executed by a Gaming Machine Controller (GMC) 1160 in FIG. 3. The game software 1202 can be configured to control the play of the game. The play of the game includes determining a game outcome and award associated with the game outcome using the RNG software 1210.

The award can be presented as a number of different presentation components where a portion of the award is associated with each presentation component. These presentation components can be referred to as game features. For example, for a video slot game, game features can involve generating a graphical representation of symbols moving and lining up along a combination of different lines. Portion of the award can be associated with different lines. In another example, the game features can involve free spins. In yet another example, the game feature can involve generating a graphical representation of symbol and then actuating a mechanical device, such as wheel to indicate an award portion.

In a further example, a game feature can involve a bonus game where a portion of an award for a game is presented in a separate bonus game. The bonus game can involve inputting choices, such as a selection of a symbol. Similar to the primary game, the bonus game can include bonus game features where bonus game award is graphically presented in a number of different portions. A primary game can include game features which trigger different bonus games with different bonus game features.

As described above, game features and bonus game features can be stored to a power hit tolerant memory (PHTM). The PHTM software 1204 can be configured to manage the transfer of crucial data to and from the PHTM. Further, as described above, the PHTM software 1204 can be configured to verify the integrity of the data stored in PHTM.

In particular embodiments, the game 1202 has no knowledge of PHTM. Thus, the utilization of the PHTM can be totally abstracted from the game 1202 and contained in a shared object that is loaded at runtime. This shared object will also determine if the PHTM is available and how much memory space is available. If there is no PHTM, or it doesn't contain enough memory, the shared object can be configured to automatically use a disk file instead. This function may allow the game to be run in a windows environment and still have the ability to recover from a power hit.

One purpose of the PHTM 1204 is proper recovery from a power hit. In order to facilitate proper power hit recovery, numerous transition points can be built into the game 1202 where crucial data is stored to PHTM at each transition. The transitions can be implemented as states, which can be referred to as game states or game state machines. The states themselves can also be stored in PHTM so that on startup, after validating that the PHTM is not corrupt, the game 1202 can then check the current state that is stored. That state will then determine where the game will restart. The idea is that whenever a state transition occurs and is saved, the data needed to recover to that state has also been stored in PHTM.

Different approaches can be used in deciding when to save data to PHTM. In one embodiment, a thread runs in the background that constantly checks the data in memory against a copy of what's in PHTM as well as a force write flag. If the force write flag has been set or if it sees that the crucial data has changed, PHTM software 1204 writes it to the physical PHTM, updating the copy as well.

In another embodiment, the PHTM software 1204 can be configured to write all data directly to PHTM as it occurs. At certain times the PHTM software 1204 can be configured to queue writes rather than committing them in order to make it an "all or nothing" write. This feature can be normally done for something that is going to cause a state change, a cash-out, etc. This feature can allow all the meters or crucial data associated with the game to be written at once, keeping the window of opportunity for corruption to the smallest amount of time possible.

In particular embodiments, multiple state machines can be used that are based on the overall game state machine. For example, separate "sub-state machines" can be used for critical functions that use external I/O devices, such as bill acceptors and printers. If the game 1202 restarts in a state that requires more granularity and has a different state machine such as a cash out or a ticket inserted state, it can switch to that sub-state machine to complete the actions and then return to the overall game state machine.

In particular embodiments, the sub-state machine concept can be used for areas of the game that are outside of the main game flow such as bonus games. For example, if the game is in a bonus game with bonus game feature including a free spin bonus round and the power cycles before all of the free spins have finished, the game will recover to the spin that was being executed when the power cycled and will continue from there. If the game is in a bonus game during a bonus game feature including a pick bonus, the game 1202 can recover to the point where the power cycle occurred. In particular, the picks that have already been made can be displayed and then the bonus game can continue from that point including receiving additional picks. Further, the game 1202 may be configured using the crucial data stored in the PHTM to regenerate on the display all or a portion of the game states prior to the power hit, such as the initial state of the game and game states that occurred prior to the bonus game.

The game playback 1206 can be used to display information associated with one or more game states of a wager-based game previously played on a gaming machine. As an example, a particular wager-based game can be initiated and played on the gaming machine. During game play of the particular game, crucial data associated with game states that occur can be stored to the PHTM. Subsequently, one or more additional games can be played on the gaming machine. Then, using crucial data recalled from the PHTM, game information associated with the particular game can be redisplayed on the gaming machine. The game information can include but is not limited to a) text information, b) screen shots that were generated during game play and c) a regeneration of all or a portion of a graphical game presentation associated with the particular game.

Typically, to access the gameplay back feature, the gaming machine has to be placed in a tilt mode where an operator menu is available. From the operator menu, using game playback software 1206, an operator can select a particular game for playback from among a plurality of games previously played on the gaming machine. To resume normal game play, the tilt mode can be cleared and the gaming machine can revert to a normal operating state. More details of game play back are described with respect to FIG. 11.

The security software 1208 can be configured to respond to information received from various security sensors disposed on the gaming machine and from the power-off security device (e.g., see 1138 in FIG. 3). For example, the security software 1208 can be configured to detect that a locking mechanism has been actuated on the gaming machine and then cause the gaming machine to enter a tilt mode. As another example, the security software 1208 can be configured to receive information from the power-off security device that the gaming machine door was opened while the gaming machine was being shipped. In response, the security software 1208 can cause the gaming machine to enter a tilt state. In yet another embodiment, the security software 1208 may not be able to detect a sensor, such as a sensor (e.g., see sensors 1140 in FIG. 3) which monitors a state of a door and in response enter a tilt state.

The RNG software 1210 can be configured to generate random numbers used to determine the outcome to a wager-based game. In one embodiment, a Mersenne twister random number generator (RNG) algorithm, which generates integers in the range $[0, 2^k-1]$ for k-bit word length with a period of $(2^{19937})-1$ can be used. It has a longer period and a higher order of equi-distribution than other pseudo-random number generators. The Mersenne Twister is also very fast computationally as it uses no division or multiplication operations in its generation process. It can work well with cache memory and pipeline processing.

In particular embodiments, the RNG cycles at seventy RNG cycles/second or above, such as equal to or above one hundred RNG cycles/second. This speed has been determined by engineers at the Nevada Gaming Control Board to be fast enough that it cannot be timed by the player. The tests showed that above seventy RNG cycles/second successfully hitting a specific outcome became sporadic, and the results were completely unpredictable at one hundred RNG cycles/second. An evaluation showed the variance in the contact mechanism of mechanical switches and the inherent variance in the "button press" detection circuitry, combined with the inability of a person to repeat a movement, provided enough ambiguity in the final registration of the button press to eliminate a player's ability to affect the payback characteristics of the game.

The RNG can be seeded using a plurality of variables. In particular embodiments, the RNG can be seeded by four variables that eliminate the same seed sequence from being used in more than one device, such as two gaming machines using the same RNG seed. The variables can be 1) absolute time, 2) time since the machine powered up, 3) machine number and 4) a random number from the kernel base RNG "/dev/urandom." The random number from the kernel can be associated with the Linux Kernel. This RNG "/dev/urandom" can be based on random occurrences, such as times between keystrokes, mouse movements, timing between interrupts, and hardware occurrences. These occurrences can be used to build and maintain an entropy pool.

The system protects against the same sequence in several ways. First, even if two games are powered on at exactly the same time, there is enough variability in the exact time that the time since power up should prevent any two games from having the same number returned from this function. Also, the "urandom" RNG is entropy based, and is self-seeded from environmental noise contained in the kernel, which makes it unlikely that two machines would ever have the same seed. Finally, the machine number (EPS number) is used as part of the seed. Because this number is used to uniquely identify the gaming machine on the floor, it should always be different from any other machine.

The communications software 1212 can be used to provide communications via the various communication interfaces and using various communication protocols. For example, the communications software 1212 can support the SAS protocol over wired or wireless communication interfaces. In another example, the communication software may allow the gaming machine to communicate with a mobile device via a wireless communication interface using a Bluetooth™ protocol.

The player tracking software 1214 may allow the GMC to communicate with a player tracking device installed on the gaming machine and/or directly with a remote server which provides player tracking services. For example, a player tracking device can be configured to communicate a GMC to transfer credits to and from the gaming machine. In another embodiment, the GMC can be configured to receive player tracking information from a card inserted in a card reader (e.g., see 1028 in FIG. 1) or via wireless communications with a player's mobile device. Then, GMC can communicate with a remote server to receive information associated with a player and send information associated with the player's game play on the gaming machine.

The devices software 1216 may be used to allow the GMC to communicate with various devices coupled to the gaming machine, such as I/O devices coupled to gaming machine. For example, the devices software may allow the GMC to communicate with a bill acceptor (e.g., see bill acceptor 1024 in FIG. 1) and in response add credits to the gaming machine. In another example, devices software may allow the GMC to communicate with a printer (e.g., see printer 1022 in FIG. 1) and in response cash out credits from the gaming machine in the form of printed ticket.

The power hit software 1218 can allow GMC to respond to power hits. For example, the power hit software can monitor the power supply and in response to a detection of power fluctuations update the PHTM with crucial data. In another example, when the gaming machine is power-up from a power hit, the power hit software 1218 can determine the power hit occurred during game play and initiate a restoration of the gaming machine to its state when the power hit occurred.

The tilt software 1220 can be configured to monitor sensors and gaming devices for tilt conditions. In response to the detection of a tilt condition, the tilt software 1220 can cause the gaming machine to enter a tilt state. Further, the tilt software 1220 can record tilt information to the PHTM.

For example, when a machine door open is detected, the game can tilt with a hard tilt that prevents play and disables the game. If the gaming machine includes a tower light, the tower light can flash to indicate that a door is open. Further, a "DOOR OPEN" indication can be displayed on the main display screen. Upon a detection of the door closing, the tower light can stop flashing and the "DOOR OPEN TILT" can be replaced with a "DOOR CLOSED SOFT TILT."

The door open tilt condition can be the behavior for all the machine doors, such as door 1014 in FIG. A or a CPU enclosure door (not shown). Additionally, the behavior may not change for multiple doors that are open. Thus, the "DOOR OPEN" indication can remain on, and the machine will be disabled until all the doors are closed. After the final door is closed, the tower light can go off, the game can become playable and the "DOOR OPEN" indication can be written over by a "DOOR CLOSED" indication which will remain until the end of the next game cycle.

A number of tilts can be generated that must be cleared by an attendant. These tilts may include clearing the condition with a key switch or, for tilts such as "PAPER OUT," the tilt may clear automatically after the attendant has remedied the malfunction. A low battery for a PHTM (e.g., see NVRAM 1122 in FIG. 3 or 1204 in FIG. 7) can be indicated by a "RAM BATTERY" tilt.

A "PRINT FAILURE" tilt can occur when there is a failure to print a ticket. In response, a printer hard tilt error can be issued and the description will indicate that the printer is offline. The tilt can be cleared when the printer is brought back online.

A "PRINT MECHANISM/PAPER JAM" tilt can occur for a paper jam. The game can indicate the paper jam has occurred and the printer is off-line (e.g., see printer 1022 in FIG. 1). This tilt can be cleared by clearing the jam and reinserting the paper into the printer.

A "PAPER OUT" tilt can occur when the printer runs out of tickets (e.g., see printer 1022 in FIG. 1). In response to detecting no remaining tickets, the game can display information indicating no paper is available and the game can be disabled. This tilt can be cleared when new printer stock is fed into the printer.

A defective storage media tilt can occur when an error is detected in a critical memory device, such as the memory storing the game software (e.g., see 1130 in FIG. 3), the memory storing the BIOS (e.g., see BIOS 1126 in FIG. 3) or the PHTM storing crucial data (e.g., see NVRAM 1122 in FIG. 3). A message indicating the validation error can be displayed. This tilt may require a "RAM CLEAR" to remedy the tilt condition. A "RAM CLEAR" can erase all meter, recall and other critical memory.

As described above, multiple copies of crucial data can be stored in the PHTM (e.g., see NVRAM 1122 in FIG. 3) and the GMC (e.g., see GMC 1160 in FIG. 3) can be configured to detect and correct copies of faulty data. When uncorrectable memory is detected in the PHTM or another device, it can result in a "CRITICAL MEMORY ERROR" tilt. Again, this tilt can require a "RAM CLEAR" to remedy the condition. Again, the "RAM CLEAR" can erase all meter, recall and other critical memory.

A "BILL JAM" can occur when the bill acceptor detects a bill jam (e.g., see bill acceptor 1024 in FIG. 1). The tilt condition can be displayed on the display, such as main display 1018 in FIG. 1. This is a hard tilt which disables the game until an operator clears the bill jam condition.

When a stacker is full, the game can displays a soft tilt error on the main screen. A "stacker full" may be displayed as a security measure. The stacker can be coupled to a bill acceptor and located in the main cabinet of a gaming machine (e.g., see bill acceptor 1024 in FIG. 1). The game can remain playable but will not accept any further currency or tickets. This tilt is automatically cleared once the stacker is emptied or replaced. When the stacker is removed, the game will be disabled and display a "STACKER OPEN" message. This tilt can be cleared when the stacker is reinserted.

The software validation software 1222 can be executed by the CPU to validate the various software components on the gaming machine. For example, hashes of memory blocks can be performed and compared to stored hash values. This software can differ from the validation logic which is executed separately by the BIOS to perform validation functions.

The metering software 1224 can be used to update the hard meters and generate and update the soft meters. The metering software 1224 can be configured to store metering information to the PHTM (e.g., see NVRAM 1122 in FIG. 3). Examples of the meters which can be maintained are described above with respect to meters 1144 in FIG. 3.

FIG. 8 illustrates a block diagram of one embodiment of a power hit tolerant memory (PHTM) (Additional details of PHTMs are described with respect to NVRAM 1122 in FIG. 3 and PHTM 1204 in FIG. 7). Crucial information associated with the current game can be stored in 1302. Some examples of crucial information include but are not limited to a wager amount, a game outcome, one or more random numbers to determine the game outcome, information about game states and sub-states including the current game state, an amount won, initial credits and frame captures associated with one or more states. As described above, this information can be used to return the game to a current state after a power-hit. The one or more random numbers can be used to regenerate a particular game outcome associated with the random numbers and the wager amount.

After a game is completed, it can be moved to a game history partition 1304. The game history partition can store crucial data associated with a plurality of previously played games. For example, in one embodiment, the PHTM 1300 can be configured to store crucial data associated with the current game and nine past games. In another embodiment, the PHTM 1300 can store information associated with up to one hundred past games.

When the maximum number of games in the game history partition is reached, the software which manages the PHTM 1300 can be configured to delete the oldest game. This process can occur prior to starting the next game. For example, if a maximum of ten games are stored in the game history 1304, then prior to the play of the eleventh game, the oldest game can be cleared from the memory. In one embodiment, prior to the deletion of the crucial data associated with the oldest game, it can be copied to a secondary persistent memory.

In 1306, accounting information can be stored. The accounting information can include the metering information previously described above. In some embodiments, this information can be recalled in the event of a power failure.

In 1308, machine configuration information can be stored. Some example of machine configuration information can include but is not limited to Manufacturer ID, date of manufacturing, machine ID, operating system version, number of screens, cabinet type, hard disk capacity, PHTM capacity, number of PHTM banks, printer model information, touch screen model information, card reader model information, bill acceptor model information, display model information, jurisdiction information, casino name and other information, sales order #, manufacture information, logo's, etc. In one embodiment, the public key used in the code validation process can be stored here.

In game configuration 1310, game configuration information can be stored. The game configuration information can include paytable selection, game features selections, bonus selections, jackpot contribution setting, denominations, max number of paylines, number of game titles and game versions. A gaming machine can have many paytables with different holding percentages which can be selected by the casino. Similarly, selectable game features and bonus features can be provided.

In security 1312, security information can be stored. Security information can include information that lead to a tilt condition and the associated tilt condition. For example, if a door is opened, the security information can include when the door was opened, when game play was disabled, when the door was closed, when the tilt condition was cleared and when game play was subsequently enabled.

FIG. 9 illustrates a method 1400 for responding to a power interruption on a gaming machine. In 1402, the gaming machine can begin a power-up process 1425. The power-up process can begin when a power switch in the interior of the gaming machine is turned on or when power is restored after a power interruption. In response to detecting external power is available, a signal can be generated which initiates a software integrity check on in 1404.

In 1404, the software integrity on the gaming machine can be checked. In particular embodiments, a public key/private key method and a "ladder of trust" can be used to verify control programs executed by the game controller. The initial rung of the ladder of trust can be the BIOS EPROM (see 1126 in FIG. 3), which may be a conventional ROM device. This conventional ROM device can load and can verify the initial code which continues the "verify then load" ladder of trust until the entire operating system and the game is loaded. This process was described above in detail with respect to FIG. 3.

In 1406, the power-off security device (see 1138 in FIG. 3) can be checked. The power-off security can monitor all the doors in the EGM. For example, the doors can use optical emitter/sensor pairs, but some might also use Hall-effect sensors. The system can be a standalone device with a CPU, RAM, NVRAM, sensors I/O board, and battery. The battery can be configured to last at least 30 days. It can be configured to record all critical events, such as power brown out, power black-out, main door open, logic (CPU) door open, bill acceptor door open, printer door open, top box door open and player tracking door open. These critical events may have occurred while the GMC was shut down and hence not monitoring the gaming machine for critical events.

In 1408, the machine integrity can be checked. For example, the security sensors on the gaming machine can be checked to verify all the doors are closed. Further, gaming devices, such as the printer and the bill acceptor, can be checked to determine the devices are operating properly (e.g., see printer 1022 and bill acceptor 1024 in FIG. 1).

In 1410, critical memory on the gaming machine can be checked. For example, the PHTM can be checked to make sure the stored information matches associated hash values. As described, a hash value can be generated for crucial data stored in the PHTM. The hash values can be stored with the crucial data. When the PHTM integrity is checked, new hash values can be generated and compared to the stored hash values.

In 1412, the GMC can determine whether all the checks were successful. If one or more of the checks are not successful, in 1414, the gaming machine can enter a tilt state and game play on the gaming machine can be disabled. Information about the tilt state can be output to a display, such as the main display on which a gaming presentation for a wager-based game is output.

In 1416, when all the checks are successful, event information associated with the successful power-up process can be stored to the PHTM. For example, the time that the gaming machine was enabled for game play can be stored to the PHTM. In one embodiment, as described above, this information can be used to generate a seed for a random number generator used on the gaming machine.

In 1418, the gaming machine can enter game play mode. Thus, the gaming machine is enabled to accept bills and tickets that are redeemed for credits on the gaming machine. After credits are deposited, the gaming machine can be used to make wagers on the game(s) available for play on the gaming machine. In 1420, the GMC can generate wager-based game play on the gaming machine and store crucial game play data to the PHTM.

Figure 10:
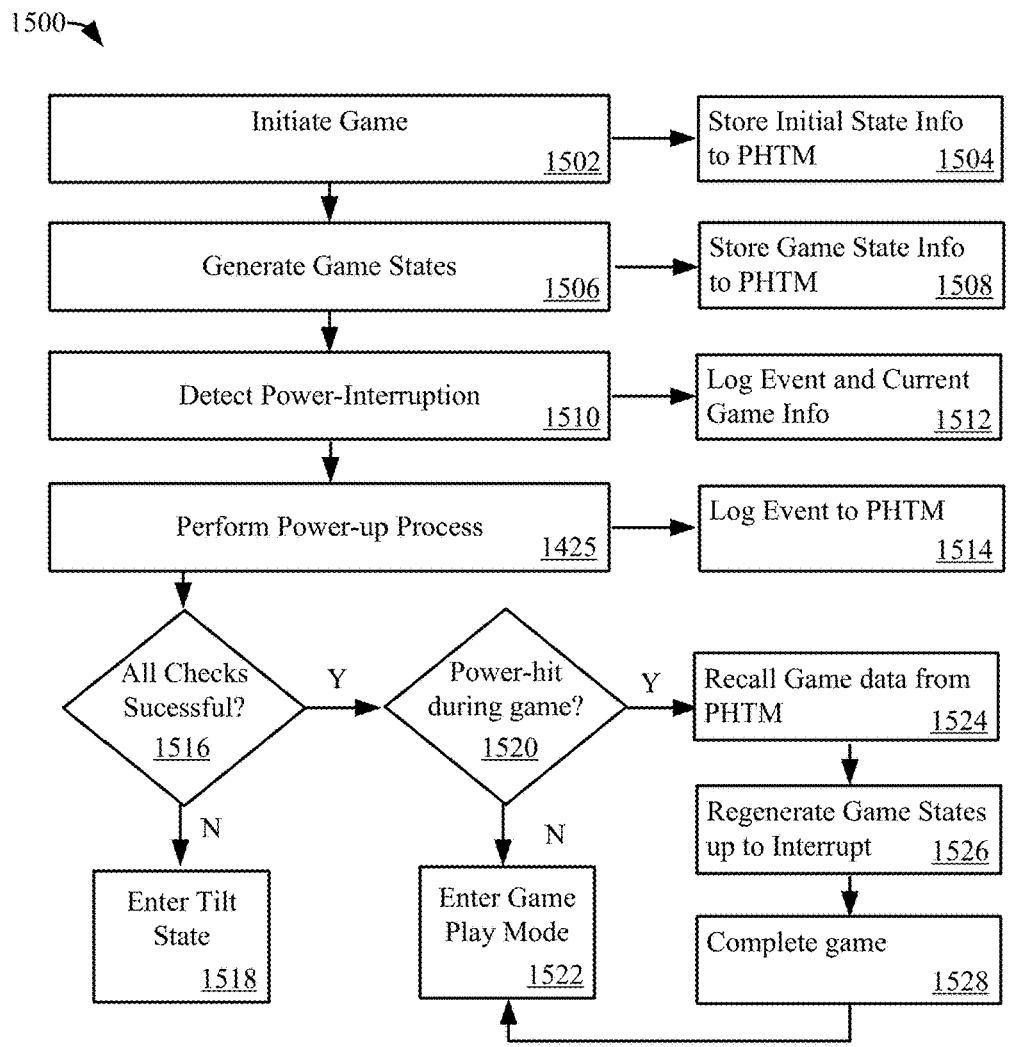
FIG. 10 illustrates a method powering up a gaming machine in accordance with embodiments of the present invention.

FIG. 10 illustrates a method 1500 powering up a gaming machine. In 1502, a wager can be placed and a game can be initiated. In 1504, initial state information associated with the game can be stored to the PHTM. In 1506, game states associated with the game can be generated. In 1508, crucial data associated with the game states can be stored to the PHTM.

In 1510, a power-interruption can be detected. For example, the GMC can receive a signal from the power supply which indicates a power spike associated with a power shutdown has occurred. In 1512, the event can be logged to the PHTM. In addition, current game state information can be logged to the PHTM prior to the power failure. After power is lost, the GMC may no longer operate unless an uninterruptable power supply is available.

In 1425, the power-up process in FIG. 9 can be performed. In 1514, this event can be logged to the PHTM. In 1516, whether the power-up process is successful can be checked. In 1518, if the check is not successful, the gaming machine can be placed in a tilt state and information about the tilt state can be output.

In 1520, a check can be performed to determine whether the power-hit occurred during the play of a game and prior to completion of the game. This information can be stored in the PHTM. In 1524, when the power-hit occurred during the play of a game, data associated with the game including the current game state can be retrieved from the PHTM. In 1526, the game can be regenerated up to the current game state just prior to the power hit. In some embodiments, the gaming machine can be configured in the current game state without showing any information leading up to the current game state. In other embodiments, one or more game states prior to the current game state can be regenerated and output to the display.

In 1528, the current game can be completed. In 1522, the game can be enabled for game play. In 1520, when the power-hit didn't occur during play of a game, the gaming machine can be powered-up and enabled for game play in 1522.

Figure 11:
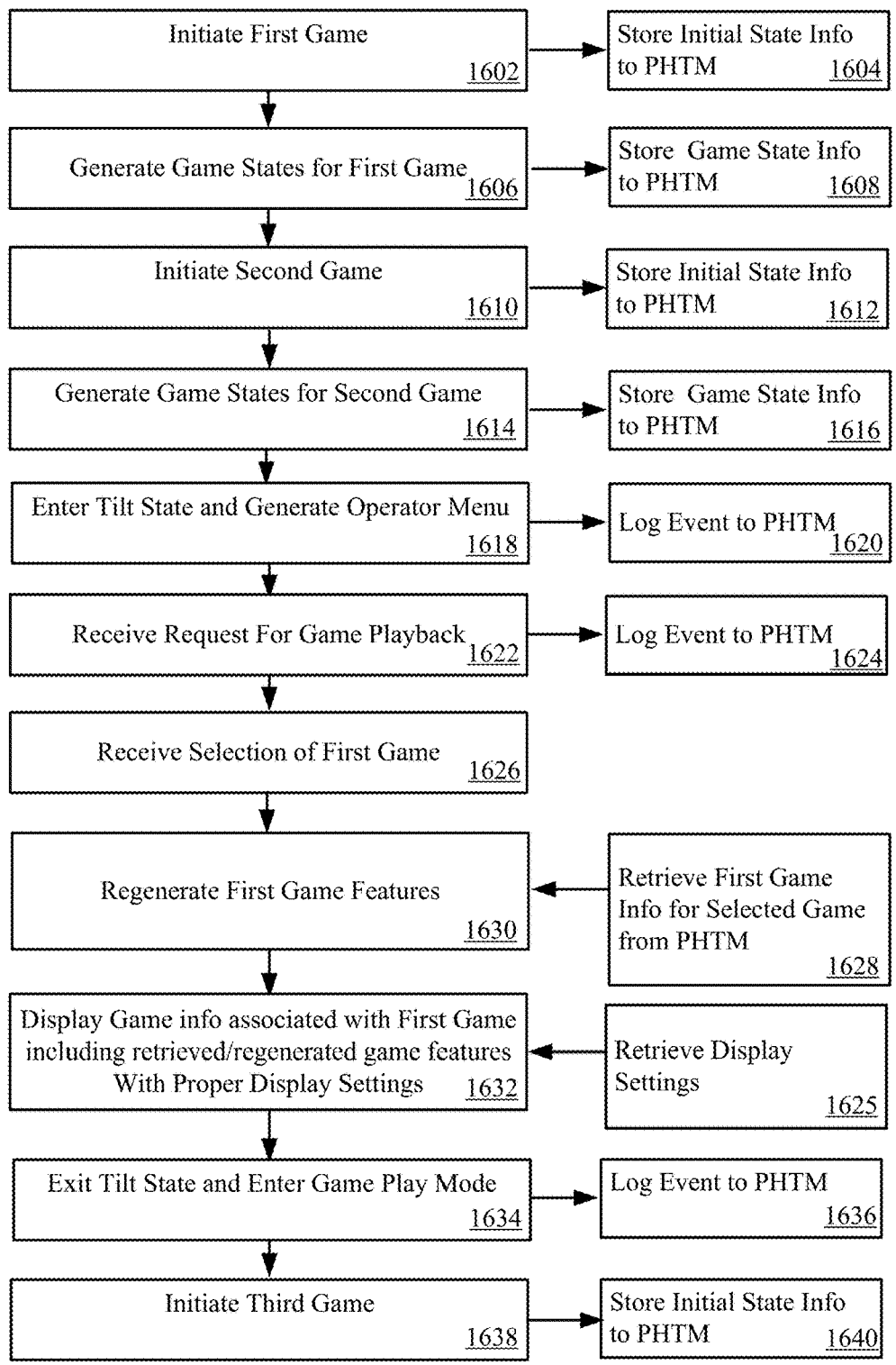
FIG. 11 illustrates a method playing back a game previously played on a gaming machine in accordance with embodiments of the present invention.

FIG. 11 illustrates a method 1600 playing back a game previously played on a gaming machine. In 1602, a first game can be initiated on the gaming machine. In 1604, initial state information about the first game can be stored to the PHTM. In 1606, game states for the first game can be generated. In 1608, the game states can be stored to the PHTM. As described, in the event of a power-hit during play of the first game, the GMC (e.g., see GMC 1160 in FIG. 3) can be configured to restore the game and the gaming machine to a game state just prior to the power hit using information retrieved from the PHTM (e.g., see NVRAM 1122 in FIG. 3).

After the completion of the first game, in 1610, a second game can be initiated. The initial state information for the second game can be stored to the PHTM (e.g., see NVRAM 1122 in FIG. 3). In 1614, the game states for the second game can be generated and the second can be brought to completion. In 1616, the game state information for the second game can be stored to the PHTM.

In 1618, the gaming machine can enter a tilt state. In one embodiment, the tilt state can be initiated in response to the operator inserting and turning a key in a locking mechanism on the outside of the gaming machine cabinet. Then, an operator menu can be generated and output to a display on the gaming machine. In 1620, the tilt state event can be logged in the PHTM.

In the 1622, the gaming machine using an input device, such as a touch screen, can receive a request for a game playback. The game playback can involve displaying information about a game previously played on the gaming machine. In 1624, this event can be logged to the PHTM. In 1626, a particular previously played game can be selected from among a plurality of games with game information stored in the PHTM. In this example, the first game played is selected.

In 1628, game information associated with the first game is retrieved from the PHTM. Some examples of game information which can be retrieved includes but are not limited one or more of random numbers used to generate the first game, screen shots, award information, bet information, credit information and screen shots from one or more game states.

In 1630, first game features can be regenerated. These game features can include animations of the play of the game, which represent one or more game states, or static images representing different game states. The animations of the play of the game can be regenerated using random numbers associated with the original play of the first game.

In 1632, game information associated with the first game, including the retrieved screen shots, regenerated static images and regenerated animations, can be output to a display on the gaming machine. In one embodiment, the display can be the display where the game presentation for the wager-based game is output (e.g., see display 1018 in FIG. 1). As described above, depending on the state of the game, the display attributes can be changed. In one embodiment, these display attributes can be reproduced as the game information is output to the display.

In one embodiment, the display settings can be stored with the game information. For example, display settings can be stored with a screen shots. In 1625, the display settings can be retrieved when the game information, such as the screen shots, is retrieved from the PHTM. Thus, in some embodiments, the display settings can be stored as data in the PHTM. The display can be configured with the retrieved settings when the game information is output to the display using the display control interface 1170 (see FIGS. 3 and 4).

In another embodiment, display logic can be included with the code which is used to regenerate static images and/or regenerate animations. Thus, as the static images and/or animations are output to the display, the display logic can be used to configure the display attributes so that the static images and animations appear in the manner that they were originally output to the display. Again, the display logic can use the display control interface 1170 described with respect to FIGS. 3 and 4 to adjust the display. In addition, the display logic can utilize the display commands described with respect to FIG. 5, to adjust particular display properties.

In 1634, the gaming machine can exit the tilt state and enter game play mode. For example, to initiate this process an operator can turn a key in the locking mechanism and remove it from the locking mechanism. In 1636, initiation of game play can be logged as an event to the PHTM. In 1638, a third game on the gaming machine can be initiated. In 1640, the initial state information associated with the third game can be stored to the PHTM.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A gaming machine comprising:
a cabinet including an entry that provides access to an interior of the cabinet, a locking mechanism coupled to the entry and a plurality of security sensors wherein at least one of the plurality of security sensors is used to detect access to the interior of the cabinet;
a power supply, disposed within the interior of the cabinet, configured to receive power from an external power source;
a power-off security device disposed within the interior of the cabinet coupled to one or more of the plurality security sensors configured to monitor access to the cabinet when the power supply is unpowered by the external power source;
a display, coupled to the cabinet, configured to output content associated with play of a wager-based game on the gaming machine, the display including 1) first firmware configured for adjusting display attributes of an entire screen of the display in response to manual attribute adjustment settings, 2) a manual input interface used to provide the manual attribute adjustment settings to the first firmware; 3) second firmware configured for adjusting the display attributes in response to automated attribute adjustment commands, 4) automated commands receiving interface which receives the commands and provides the received commands to the second firmware, and 5) a plurality of video inputs;
a non-volatile memory, disposed within a locked box within the interior of the cabinet, configured to store gaming software used to generate the wager-based game on the gaming machine;
a power-hit tolerant memory, disposed within the locked box within the interior of the cabinet, configured to store crucial data associated with play of a plurality instances of the wager-based game; and
a gaming machine controller, including a processor and a memory, disposed within a locked box within the interior of the cabinet, coupled to the power supply, the power-off security device, the plurality of security sensors, the display including one or more of the video inputs and the automated commands receiving interface of the display, the non-volatile memory and the power-hit tolerant memory, the gaming machine controller being configured to 1) control play of the wager-based game; 2) validate the gaming software, 3) verify integrity of crucial data stored within the power hit tolerant memory, 4) monitor the power-off security device and the plurality of security sensors to detect tilt conditions; 5) store the crucial data associated with a plurality of instances of the wager-based game to the power-hit tolerant memory wherein the crucial data at least allows portions of the wager-based game to be re-displayed for a particular instance of the wager-based game after the particular instance of the wager-based game is complete; 6) after a power interruption, determine that a power-hit occurred prior to a completion of the play of the particular instance of the wager-based game and 7) restore a game state of the wager-based game to the particular instance of the wager-based game that occurred just prior to the power interruption;
wherein the gaming machine controller includes gaming display control logic responsive to internal game states and internal non-game states of the gaming machine and configured to determine when to automatically cause changes to the display attributes of the entire screen of the display in response to the internal game states and the internal non-game states of the gaming machine using the commands sent to the display via the automated commands receiving interface.

2. The gaming machine of claim 1, wherein the internal non-game states of the gaming machine include at least one of a tilt state and an attract state.

3. The gaming machine of claim 1, wherein the gaming machine controller, in response to detecting one of the internal states of the gaming machine is changed from one of a game state to an attract state or the attract state to the game state, changes one or more of the display attributes using the commands.

4. The gaming machine of claim 3, wherein the changes to one or more of the display attributes includes changing one or more of a brightness, contrast, color temperature attributes of the display or combinations thereof.

5. The gaming machine of claim 1, wherein the gaming machine controller, in response to detecting one of the internal states of the gaming machine is changed from a first game state to a second game state, changes one or more of the display attributes using the commands.

6. The gaming machine of claim 5, wherein the second game state includes outputting an indication of a bonus to the display.

7. The gaming machine of claim 1, wherein detection by the gaming display control logic of a change to one of the internal game states and the internal non-game states of the gaming machine causes the gaming machine controller to automatically change a value of one or more of a brightness, a contrast and/or a color temperature attribute of the entire screen of the display using the commands sent to the display via the automated commands receiving interface.

8. The gaming machine of claim 7, wherein the value is automatically changed in a single step from its current value to a predetermined new value.

9. The gaming machine of claim 7, wherein the value is gradually automatically changed in a plurality of steps from its current value to a predetermined new value.

10. The gaming machine of claim 1, wherein the gaming machine controller is further configured to determine a current length of a game play session including play of the wager-based game and to set the display attributes of the entire screen of the display based upon the determined current length of the game play session.

11. The gaming machine of claim 10, wherein one or more of a value of a brightness, a value of a contrast, a value of a color temperature or combinations thereof are changed based upon the determined current length of the game play session.

12. The gaming machine of claim 1, wherein the gaming machine controller is configured, prior to determining whether to change the display attributes of the entire screen of the display in response to detection of a change in at least one of the internal game states and internal non-game states of the gaming machine, to send a command to the display requesting current values of the display attributes where the request is satisfied without altering what is currently displayed on the entire screen of the display.

13. The gaming machine of claim 1, wherein the gaming machine controller is further configured to turn on or place the display in a stand-by mode using the commands.

14. The gaming machine of claim 1, wherein the gaming machine controller is further configured to a select, using the commands, one of the plurality of video inputs from which to receive video content.

15. The gaming machine of claim 1, wherein, in response to the gaming display control logic detecting a change for at least one of the internal game states and internal non-game states of the gaming machine, the gaming machine controller determines new display attributes corresponding to the detected change, reconfigures the entire screen of the display with the new display attributes using the commands and stores the new display attributes as crucial data to the non-volatile memory.

16. The gaming machine of claim 1, further comprising: a second display, coupled to the cabinet, the second display including 1) third firmware for manually adjusting second display attributes of an entire screen of the second display, the manual adjusting including presenting an on-display interface informing a manual user of a current attribute value, 2) a second manual input interface used to provide manual user inputs to the third firmware to thereby cause adjustment of the second display attributes using the third firmware; 3) fourth firmware for adjusting the second display attributes wherein the fourth firmware is configured to receive a plurality of remote commands from a remote controller for remotely adjusting the second display attributes, 4) a second automated commands receiving interface which receives the remote commands from the gaming machine controller and 5) a second plurality of video inputs
wherein the gaming display control logic is configured to automatically determine when to change the second display attributes in response to detection of change for at least one of the internal game states and internal non-game states of the the gaming machine using the remote commands sent to the second display via the second automated commands receiving interface.

17. The gaming machine of claim 1, wherein the crucial data includes a frame captured from the play of the particular instance of the wager-based game wherein the gaming machine controller is configured to redisplay the frame using same display attributes from when the frame was first output to the display.

18. The gaming machine of claim 17, wherein the crucial data further includes the same display attributes.

19. The gaming machine of claim 1, wherein the gaming machine controller is further configured to enter a tilt state including an operator mode after the particular instance of the wager-based game is complete, output a menu to the display which allows the particular instance of the wager-based game to be selected from among the plurality of instances of the wager-based game, receive a selection of the particular instance of the wager-based game from the menu, retrieve the crucial data associated with the particular instance of the wager-based game from the power hit tolerant memory and based upon the retrieved crucial data, regenerate and output to the display all or a portion of the play of the particular instance of the wager-based game including setting current display attributes of the entire screen to match the display attributes previously used to output the particular instance of the wager-based game on the display.

20. The gaming machine of claim 1, wherein the gaming machine controller is further configured to restore the display attributes on the display to their values that occurred just prior to the power interruption.

21. The gaming machine of claim 1, where the gaming machine controller interface is a serial interface.

22. The gaming machine of claim 1, wherein the gaming machine controller is further configured to reset the display attributes of the display to factory values using the commands.

23. A gaming machine having internal game states and internal non-game states and comprising:
  a display configured to present game action during the game states, the display having configurable display attributes that each affect an entire screen of the display, the display attributes being reconfigurable without presenting configuration information on the screen; and
  gaming display control logic configured to automatically detect changes in at least one of the internal game states and the internal non-game states of the gaming machine, to determine when to automatically cause changes to one or more of the display attributes of the entire screen of the display in response to detected changes in at least one of the internal game states and the internal non-game states of the gaming machine and to automatically cause the changes to the display attributes without presentation of configuration information on the screen.

* * * * *